US011629287B2

(12) United States Patent
Higuchi et al.

(10) Patent No.: US 11,629,287 B2
(45) Date of Patent: Apr. 18, 2023

(54) METAL-COMPLEX-BASED ELECTROCHROMIC DEVICE

(71) Applicants: NATIONAL INSTITUTE FOR MATERIALS SCIENCE, Tsukuba (JP); NATIONAL TAIWAN UNIVERSITY, Taipei (TW)

(72) Inventors: Masayoshi Higuchi, Tsukuba (JP); Hsin-Che Lu, Tsukuba (JP); Kuo-Chuan Ho, Taipei (TW)

(73) Assignees: National Institute for Materials Science, Ibaraki (JP); National Taiwan University, Taipei (TW)

( * ) Notice: Subject to any disclaimer, the term of this patent is extended or adjusted under 35 U.S.C. 154(b) by 65 days.

(21) Appl. No.: 16/981,036

(22) PCT Filed: Mar. 15, 2019

(86) PCT No.: PCT/JP2019/010928
§ 371 (c)(1),
(2) Date: Sep. 15, 2020

(87) PCT Pub. No.: WO2019/177160
PCT Pub. Date: Sep. 19, 2019

(65) Prior Publication Data
US 2021/0109416 A1    Apr. 15, 2021

(30) Foreign Application Priority Data
Mar. 16, 2018   (JP) .............................. JP2018-049615

(51) Int. Cl.
*G02F 1/15*       (2019.01)
*G02F 1/155*      (2006.01)
(Continued)

(52) U.S. Cl.
CPC .................. *C09K 9/00* (2013.01); *C09K 9/02* (2013.01); *G02F 1/1508* (2013.01);
(Continued)

(58) Field of Classification Search
CPC ...... G02F 1/155; G02F 1/1508; G02F 1/1524; G02F 2001/1517
See application file for complete search history.

(56) References Cited

U.S. PATENT DOCUMENTS 7,586,665 B1 * 9/2009 Martin ................ G02F 1/15165
359/273
2009/0270589 A1   10/2009 Higuchi et al.
(Continued)

FOREIGN PATENT DOCUMENTS

EP   2851745 A1   3/2015
JP   5062711 B    10/2012
(Continued)

OTHER PUBLICATIONS

Jie Chen, Kelong Huang, Suqin Liu, Xi Hu, Electrochemical supercapacitor behavior of Ni3(Fe(CN)6)2(H2O) nanoparticles, Journal of Power Sources 186 (2009) 565-569. (Year: 2009).*
(Continued)

*Primary Examiner* — Bijan Ahvazi
(74) *Attorney, Agent, or Firm* — Crowell & Moring LLP

(57) ABSTRACT

An object of the present invention is to provide a novel electrochromic device (ECD). Disclosed is an electrochromic device (ECD) comprising two metal-complex-based electrochromic thin films individually acting as a working electrode and a counter electrode; (i) one of the two metal-complex-based electrochromic thin films being a film of a cathodically coloring metallo-supramolecular polymer comprising at least one organic ligand having a plurality of metal coordination positions and a metal ion of at least one
(Continued)

transition metal and/or lanthanoid metal with the at least one organic ligand and the metal ion being arranged alternately, and the other of the two metal-complex-based electrochromic thin films being a film of an anodically coloring metal hexacyanoferrate (MHCF) represented by the formula: $M(II)_3[Fe(III)CN_6]_2$ (where M=Fe, Ni or Zn), and (ii) the electrochromic device having a first conducting substrate; the film of the cathodically coloring metallo-supramolecular polymer; an electrolyte; the film of the anodically coloring metal hexacyanoferrate (MHCF); and a second conducting substrate being arranged in this order.

4 Claims, 14 Drawing Sheets

(51) Int. Cl.
G02F 1/1524 (2019.01)
C09K 9/00 (2006.01)
G02F 1/1506 (2019.01)
C09K 9/02 (2006.01)
G02F 1/1516 (2019.01)

(52) U.S. Cl.
CPC ........ G02F 1/1524 (2019.01); G02F 1/15165 (2019.01); C09K 2211/1025 (2013.01); C09K 2211/1029 (2013.01); C09K 2211/1044 (2013.01); C09K 2211/1059 (2013.01); C09K 2211/1088 (2013.01); C09K 2211/1096 (2013.01); C09K 2211/18 (2013.01); C09K 2211/187 (2013.01); C09K 2211/188 (2013.01); G02F 1/155 (2013.01); G02F 2001/1517 (2013.01); G02F 2001/15025 (2019.01); G02F 2001/1557 (2013.01)

(56) References Cited

U.S. PATENT DOCUMENTS

2014/0175281 A1 6/2014 Reynolds et al.
2018/0088426 A1* 3/2018 Posset .................. G02F 1/15

FOREIGN PATENT DOCUMENTS

JP         2014-523000 A    9/2014
WO     WO 2016/150921 A1   9/2016
WO     WO-2017034036 A1 *  3/2017  ............ B82Y 20/00

OTHER PUBLICATIONS

Mortimer et al., "Novel Color-Reinforcing Electrochromic Device Based on Surface-Confined Ruthenium Purple and Solution-Phase Methyl Viologen", Chem. Mat,, 2011, 23, 4077-4082, 6 pages.
Lin et al., "A Complementary Electrochromic System Based on a Prussian Blue Thin Film and a Heptyl Viologen Solution", Sol. Energy Mater. Sol. Cells, 2011, 95, 3074-3080, 7 pages.
Granqvist, "Electrochromic Tungsten Oxide Films: Review of Progress 1993-1998", Sol. Energy Mater. Sol. Cells 2000, 60, 201-262, 62 pages.
Wen et al., "Eliminating Electrochromic Degradation in Amorphous TiO2 through Li-Ion Detrapping", ACS Appl. Mater. Interfaces 2016, 8, 5777-5782, including Supplementary Information, 18 pages.
Gaupp et al., "Composite Coloration Efficiency Measurements of Electrochromic Polymers based on 3, 4-Aikylenedioxythiophenes", Chem. Mater. 2002, 14, 3964-3970, 7 pages.
Osterholm, et al., "Four Shades of Brown: Tuning of Electrochromic Polymer Blends Toward High-Contrast Eyewear", ACS Appl. Mater, Interfaces 2015, 7, 1413-1421, 22 pages.
Ho et al., "The Influences of Operating Voltage and Cell Gap on the Performance of a Solution-Phase Electrochromic Device Containing HV and TMPD", Solid State Ion. 2003, 165, 279-287, 9 pages.
Lu et al., "An Electrochromic Device Based on Prussian Blue, Self-Immobilized Vinyl Benzyl Viologen, and Ferrocene", Sol. Energy Mater. Sol. Cells, 2016, 147, 75-84, 10 pages.
Jain et al., "High-Contrast Solid-State Electrochromic Devices of Viologen-Bridged Polysilsesquioxane Nanoparticles Fabricated by Layer-by-Layer Assembly", ACS Appl. Mater. Interfaces 2009, 1, 83-89, 7 pages.
Jelle et al., "Transmission Spectra of an Electrochromic Window Based on Polyaniline, Prussian Blue and Tungsten-Oxide", J. Electrochem. Soc. 1993, 140, 3560-3564, 6 pages.
Hong et al., "Nano-Prussian Blue Analogue/PEDOT:PSS Composites for Electrochromic Windows", Sol. Energy Mater. Sol. Cells 2012, 104, 64-74, 11 pages.
Pichot et al., "A Series of Multicolor Electrochromic Ruthenium (II) Trisbipyridine Complexes: Synthesis and Electrochemistry", J, Phys. Chem. A 1999, 103, 6263-6267, with Supplemental Material, 14 pages.
Yamamoto et al., "Stepwise Radial Complexation of Imine Groups in Phenylazomethine Dendrimers", Nature 2002, 415, 509-511, 3 pages.
Han et al., "Metallosupramolecular Polyelectrolytes Self-Assembled from Various Pyridine Ring Substituted Bisterpyridines and Metal Ions: Photophysical, Electrochemical and Electrochromic Properties", J. Am. Chem. Soc. 2008, 130, 2073-2081, with Supporting Information, 30 pages.
Han et al., "Metallo-Supramolecular Polymers Based on Functionalized Bis-terpyridines as Novel Electrochromic Materials", Adv, Mater. 2007, 19, 3928-3931, 4 pages.
International Search Report of Application No. PCT/JP2019/010928, dated May 21, 2019, 9 pages.
Extended European Search Report in Europe Application No. 19766525.0 dated Oct. 6, 2021, 7 pages.
Communication pursuant to Article 94(3) EPC, in Europe Application No. 19766525.0, dated Jun. 1, 2022.
Office Action in Japan Application No. 2020-547426, including English translation, dated Oct. 11, 2022, 7 pages.

* cited by examiner

METAL-COMPLEX-BASED ELECTROCHROMIC DEVICE

This application is a 371 application of PCT/JP2019/010928 having an international filing date of Mar. 15, 2019, which claim priority to JP2018-049615 filed Mar. 16, 2018, the entire content of each of which is incorporated herein by reference.

TECHNICAL FIELD

This invention relates to an electrochromic device (ECD) comprising two metal-complex-based electrochromic thin films individually acting as a working electrode and a counter electrode.

BACKGROUND ART

Electrochromic (EC) materials exhibiting various colors have been successfully used for commercial products such as displays, anti-glare mirrors, sunglasses, and solar-attenuated windows. Because of a relatively low driving voltage (i.e., operating potential), a low consuming energy and a user-controllable color change comparing to other techniques such as suspension particles, liquid crystal and thermochromism, electrochromic devices (ECDs) are attractive in terms of energy-saving and sustainability. To enhance the coloring/bleaching contrast, a redox-complementary electrochromic device (i.e., an electrochemical cell integrating electrochromic (EC) materials and an electrolyte) has been developed (see Non-Patent Literatures 1 and 2). It is a device in which a pair of electrochromic materials, i.e., anodically and cathodically coloring electrochromic materials, change their colors in phase and thus, enhance the coloring/bleaching contrast.

Since EC technology was first introduced, numerous kinds of EC materials have been studied, for examples, metal oxides (see Non-Patent Literatures 3 and 4), conducting polymers (see Non-Patent Literatures 5 and 6), viologens (see Non-Patent Literatures 7 to 9), Prussian blue analogues (see Non-Patent Literatures 10 and 11). As a new class of EC materials, metallo-supramolecular polymers (MEPEs) synthesized by complexing metal salts with organic ligands, have caught much attention because of their outstanding color changes attributed to the following mechanisms: disappearance/appearance of a metal-to-ligand charge transfer (MLCT), variation in strength of d-d* transition in the metal ion, and an intervalence charge transfer (IVCT). In addition, the EC properties of MEPEs could be tuned in molecular level by introducing ligands with different structures or varying the metal ions, giving the possibility of changing in optical characteristics across ultraviolet, visible, and near-infrared light regions (see Non-Patent Literatures 12 to 15).

Japanese Patent No. 5062171 (hereinafter referred to as Patent Literature 1) discloses metallo-supramolecular polymers (MEPEs) suitable for electrochromic devices and a process for producing the polymer. However, according to experiments conducted by the present inventors, it has been found that an electrochromic device using a known type of MEPEs as disclosed in Patent Literature 1 and having no counter electrode material can exhibit a driving voltage that is as high as about 3 Volt, for example (although the voltage level is lower than conventional other techniques such as suspension particles, liquid crystal and thermochromism). Various kinds of counter electrode materials have been so far investigated when MEPEs are used for electrochromic devices, but any counter electrode material possible to greatly decrease the driving voltage to a level that is much less than around 3 Volt has not been found out. Therefore, development of electrochromic devices with a specific combination of a MEPE and a counter electrode material making it possible to show a sufficiently low level of driving voltage (or operating potential) has been demanded.

CITATION LIST

Patent Literature

[PTL 1] Japanese Patent No. 5062171

Non-Patent Literature

[NPL 1] R. J. Mortimer and T. S. Varley, Novel Color-Reinforcing Electrochromic Device Based on Surface-Confined Ruthenium Purple and Solution-Phase Methyl Viologen, Chem. Mat., 2011, 23, 4077-4082

[NPL 2] C.-F. Lin, C.-Y. Hsu, H.-C. Lo, C.-L. Lin, L.-C. Chen and K.-C. Ho, A Complementary Electrochromic System based on a Prussian Blue Thin Film and a Heptyl Viologen Solution, Sol. Energy Mater. Sol. Cells, 2011, 95, 3074-3080

[NPL 3] Granqvist, C. G. Electrochromic Tungsten Oxide Films: Review of Progress 1993-1998. *Sol. Energy Mater. Sol. Cells* 2000, 60, 201-262

[NPL 4] Wen, R. T.; Niklasson, G. A.; Granqvist, C. G. Eliminating Electrochromic Degradation in Amorphous $TiO_2$ through Li-ion Detrapping. *ACS Appl. Mater. Interfaces* 2016, 8, 5777-5782

[NPL 5] Gaupp, C. L.; Welsh, D. M.; Rauh, R. D.; Reynolds, J. R. Composite Coloration Efficiency Measurements of Electrochromic Polymers based on 3, 4-Alkylenedioxythiophenes. *Chem. Mater.* 2002, 14, 3964-3970

[NPL 6] Osterholm, A. M.; Shen, D. E.; Kerszulis, J. A.; Bulloch, R. H.; Kuepfert, M.; Dyer, A. L.; Reynolds, J. R. Four Shades of Brown: Tuning of Electrochromic Polymer Blends toward High-Contrast Eyewear. *ACS App. Mater. Interfaces* 2015, 7, 1413-1421

[NPL 7] Ho, K. C.; Fang, Y. W.; Hsu, Y. C.; Chen, L. C. The Influences of Operating Voltage and Cell Gap on the Performance of a Solution-phase Electrochromic Device Containing HV and TMPD. *Solid State Ion.* 2003, 165, 279-287

[NPL 8] Lu, H. C.; Kao, S. Y.; Chang, T. H.; Kung, C. W.; Ho, K. C. An Electrochromic Device Based on Prussian Blue, Self-Immobilized Vinyl Benzyl Viologen, and Ferrocene. *Sol. Energy Mater. Sol. Cells* 2016, 147, 75-84

[NPL 9] Jain, V.; Khiterer, M.; Montazami, R.; Yochum, H. M.; Shea, K. J.; Heflin, J. R. High-Contrast Solid-State Electrochromic Devices of Viologen-Bridged Polysilsesquioxane Nanoparticles Fabricated by Layer-by-Layer Assembly. *ACS Appl. Mater. Interfaces* 2009, 1, 83-89

[NPL 10] Jelle, B. P.; Hagen, G. Transmission Spectra of an Electrochromic Window Based on Polyaniline, Prussian Blue and Tungsten-Oxide. *J. Electrochem. Soc.* 1993, 140, 3560-3564

[NPL 11] Hong, S. F.; Chen, L. C. Nano-Prussian Blue Analogue/PEDOT:PSS Composites for Electrochromic Windows. *Sol. Energy Mater. Sol. Cells* 2012, 104, 64-74

[NPL 12] Pichot, F.; Beck, J. H.; Elliott, C. M. A Series of Multicolor Electrochromic Ruthenium(II) Trisbipyridine Complexes: Synthesis and Electrochemistry. *J. Phys. Chem. A* 1999, 103, 6263-6267

[NPL 13] Yamamoto, K.; Higuchi, M.; Shiki, S.; Tsuruta, M.; Chiba, H. Stepwise Radial Complexation of Imine Groups in Phenylazomethine Dendrimers. *Nature* 2002, 415, 509-511

[NPL 14] Han, F. S.; Higuchi, M.; Kurth, D. G. Metallo-Supramolecular Polyelectrolytes Self-assembled from Various Pyridine Ring Substituted Bis-terpyridines and Metal Ions: Photophysical, Electrochemical and Electrochromic Properties. *J. Am. Chem. Soc.* 2008, 130, 2073-2081

[NPL 15] Han, F. S.; Higuchi, M.; Kurth, D. G. Metallo-Supramolecular Polymers Based on Functionalized Bis-terpyridines as Novel Electrochromic Materials. *Adv. Mater.* 2007, 19, 3928-3931

SUMMARY OF INVENTION

Technical Problem

An object of the present invention is to provide a novel electrochromic device (ECD) comprising two metal-complex-based electrochromic thin films individually acting as a working electrode and a counter electrode.

Another object of the present invention is to provide an electrochromic device with a specific combination of a MEPE and a counter electrode material making it possible to show a sufficiently low level of driving voltage or operating potential (preferably, 1.0 V or less).

Still another object of the present invention is to provide an electrochromic device with a specific combination of a MEPE and a counter electrode material making it possible to show a sufficiently low level of driving voltage or operating potential (preferably, 1.0 V or less) as well as excellent electrochemical response and excellent coloration efficiency.

Solution to Problem

We have strenuously studied a lot of combinations of various types of MEPEs and counter electrode materials to seek electrochromic devices making it possible to show a sufficiently low level of driving voltage, and at last we have found out that a dramatically reduced level of driving voltage can be obtained by a specific combination of a MEPE and a counter electrode material.

Attributes of the present invention to achieve the object(s) can be represented as follows:

[1]. An electrochromic device (ECD) comprising two metal-complex-based electrochromic thin films individually acting as a working electrode and a counter electrode; (i) one of the two metal-complex-based electrochromic thin films being a film of a cathodically coloring metallo-supramolecular polymer comprising at least one organic ligand having a plurality of metal coordination positions and a metal ion of at least one transition metal and/or lanthanoid metal with the at least one organic ligand and the metal ion being arranged alternately, and the other of the two metal-complex-based electrochromic thin films being a film of an anodically coloring metal hexacyanoferrate (MHCF) represented by the formula: $M(II)_3[Fe(III)CN_6]_2$ (where M is at least one selected from Fe, Ni, and Zn), and (ii) the electrochromic device having a configuration of a first conducting substrate; the film of the cathodically coloring metallo-supramolecular polymer; an electrolyte; the film of the anodically coloring metal hexacyanoferrate (MHCF); and a second conducting substrate being arranged in this order.

[2]. The electrochromic device according to the above attribute [1], wherein the at least one organic ligand comprises an organic ligand having at least two selected from terpyridyl group, bipyridyl group, pyridyl group, phenanthrolyl group, acethlacetonato group and their derivatives.

[3]. The electrochromic device according to the above attribute [1] or [2], wherein the at least one transition metal and/or lanthanoid metal comprises a metal selected from iron (Fe), cobalt (Co), nickel (Ni), copper (Cu), zinc (Zn), ruthenium (Ru), rhodium (Rh), palladium (Pd), silver (Ag), osmium (Os), iridium (Ir), platinum (Pt), gold (Au), europium (Eu) and terbium (Tb).

[4]. The electrochromic device according to any one of the above attributes [1] to [3], wherein the at least one organic ligand comprises an organic ligand having a structure represented by at least one of the following formulae:

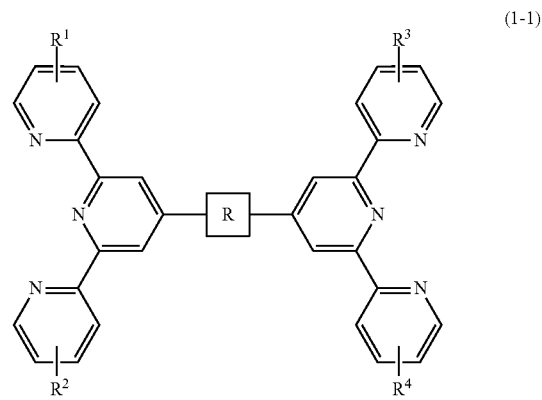

(1-1)

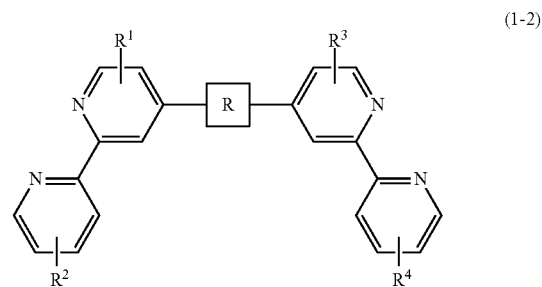

(1-2)

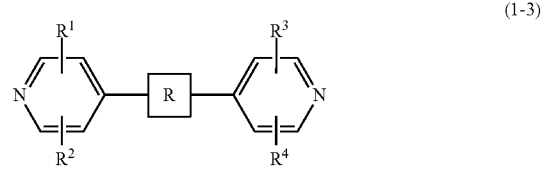

(1-3)

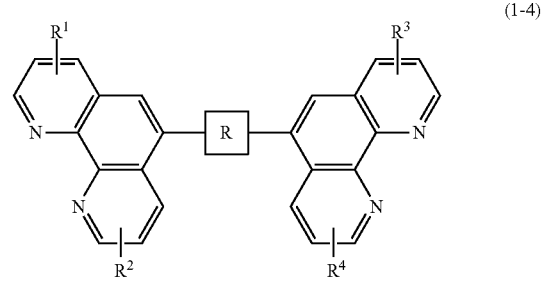

(1-4)

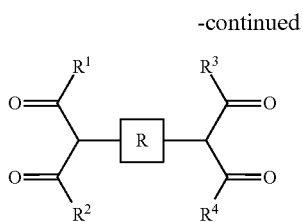

(1-5)

wherein R is a spacer comprising a carbon atom(s) and a hydrogen atom(s), or a spacer directly connecting two moieties independently selected from terpyridyl group, bipyridyl group, pyridyl group, phenanthrolyl group, acethylacetonato group; and $R^1$, $R^2$, $R^3$ and $R^4$ are each independently a hydrogen atom, an aryl group or an alkyl group.

[5]. The electrochromic device according to any one of the above attributes [1] to [4], wherein the at least one transition metal and/or lanthanoid metal comprises Fe; and the M of the formula: $M(II)_3[Fe(M)CN_6]_2$ comprises Ni.

[6]. The electrochromic device according to any one of the above attributes [1] to [5], wherein the electrolyte is a liquid electrolyte or a solid-state electrolyte.

[7]. The electrochromic device according to any one of the above attributes [1] to [5], wherein the electrolyte is a solid-state electrolyte comprising acetonitrile, a poly(methyl methacrylate) (PMMA), propylene carbonate (PC), and $MClO_4$ (where M=Li or Na).

Advantageous Effects of Invention

According to the present invention, a dramatically reduced level of driving voltage (preferably 1.0 V or less, more preferably less than 1.0 V, for example, approximately 0.8 V) can be obtained by using the specific combination of a MEPE and a counter electrode material. It should be noted that the driving voltage can be often reduced to a level that is as low as about 0.8 V, which is much lower than an average level of a driving voltage obtainable by conventional techniques.

DESCRIPTION OF EMBODIMENTS

Figure 1:
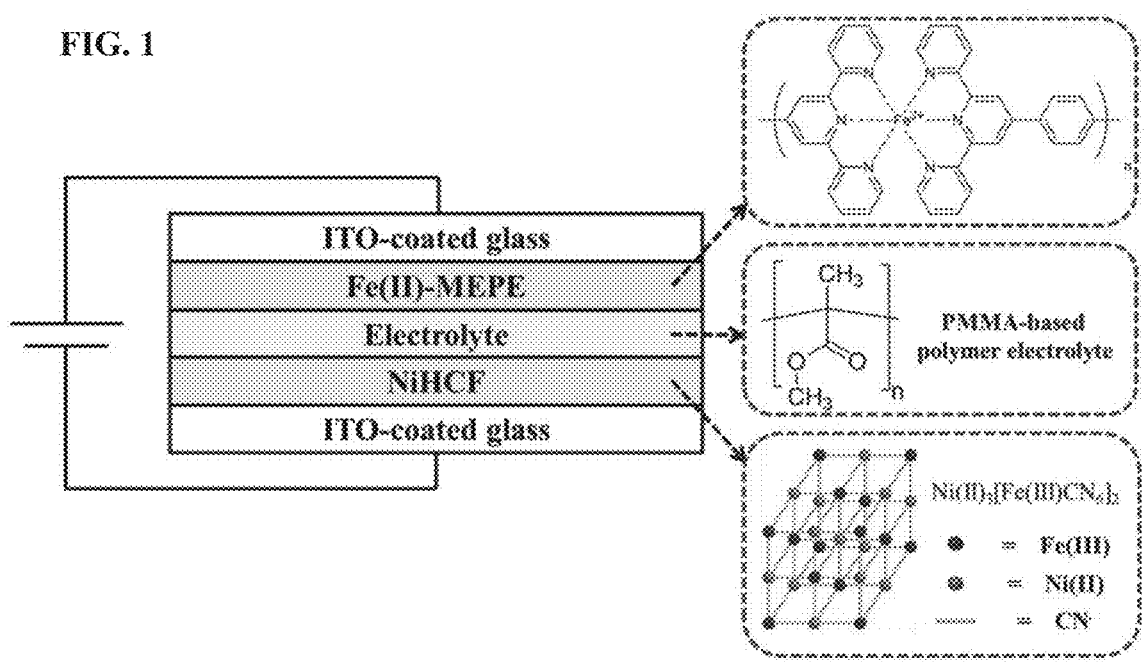
FIG. 1 shows a configuration of the S-ECD that is a typical embodiment according to the invention.

The electrochromic device (ECD) of the invention comprises two metal-complex-based electrochromic thin films individually acting as a working electrode and a counter electrode. That is, the electrochromic device (ECD) is characterized in that both the two electrochromic thin films acting as a working electrode and a counter electrode are made from metal complexes.

One of the two metal-complex-based electrochromic thin films is a film of a cathodically coloring metallo-supramolecular polymer comprising at least one organic ligand having a plurality of metal coordination positions and a metal ion of at least one transition metal and/or lanthanoid metal with the at least one organic ligand and the metal ion being arranged alternately, whereas the other of the two metal-complex-based electrochromic thin films is a film of an anodically coloring metal hexacyanoferrate (MHCF) represented by the formula: $M(II)_3[Fe(III)CN_6]_2$ (where M is at least one selected from Fe, Ni, and Zn). The electrochromic device has a configuration of a first conducting substrate; a film of the cathodically coloring metallo-supramolecular polymer; an electrolyte; a film of the anodically coloring metal hexacyanoferrate (MHCF); and a second conducting substrate, which are arranged in this order.

Upon a potential bias, the device is redox-complementary owing to redox reactions of two metal-complexes, that is, an oxidation of the metal (e.g., M(II) into M (III)) in the cathodically coloring metallo-supramolecular polymer and a reduction of $M(III)CN_6^{3-}$ into $M(II)CN_6^{4-}$ in the anodically coloring metal hexacyanoferrate represented by the formula: $M(II)_3[Fe(III)CN_6]$ (MHCF), which are followed by the complementary migration of a supporting electrolyte, e.g., an alkali metal perchlorate ($MClO_4$, where M=Li or Na). When $MClO_4$ is used, $M^+$ is migrated into MHCF and $ClO_4^-$ is migrated into M(II)-MEPE to compensate the additional charge.

The complementary migration of the supporting electrolyte enables both the thin films of the cathodically coloring metallo-supramolecular polymer (e.g., M(II)-MEPE, where M=Fe, Ru, and Co) and the anodically coloring metal hexacyanoferrate (e.g., NiHCF) to storage the cation ($M^+$) and the anion ($ClO_4^-$) respectively in a substantially equal amount, thus allowing a stable operation during a lot of cycles (e.g., 1,500 cycles) with the aid of a solid-state or liquid electrolyte and leading to a small potential window (e.g., about 0.8 V).

The organic ligand of the cathodically coloring metallo-supramolecular polymer is not particularly limited, but in certain embodiments, it comprises an organic ligand having at least two selected from terpyridyl group, bipyridyl group, pyridyl group, phenanthrolyl group, acethylacetonato group and their derivatives.

These organic ligands may or may not have a substituent(s). In a case where the organic ligands have a substituent(s), examples of the substituent include a branched or linear alkyl group with a carbon number of 1 to 20 and an aryl group with a carbon number of 6 to 20 that may contain a hetero group.

The transition metal and/or lanthanoid metal of the cathodically coloring metallo-supramolecular polymer is not particularly limited, but in certain embodiments, it comprises a metal selected from iron (Fe), cobalt (Co), nickel (Ni), copper (Cu), zinc (Zn), ruthenium (Ru), rhodium (Rh), palladium (Pd), silver (Ag), osmium (Os), iridium (Ir), platinum (Pt), gold (Au), europium (Eu) and terbium (Tb).

Examples of the organic ligand of the cathodically coloring metallo-supramolecular polymer include at least one bisterpyridine derivative represented by formula (1-1), at least one bipyridine derivative represented by formula (1-2), at least one pyridine derivative represented by formula (1-3), at least one phenanthroline derivative represented by formula (1-4), at least one acetylacetone derivative represented by formula (1-5), and a combination of two or more selected from these members, as follows:

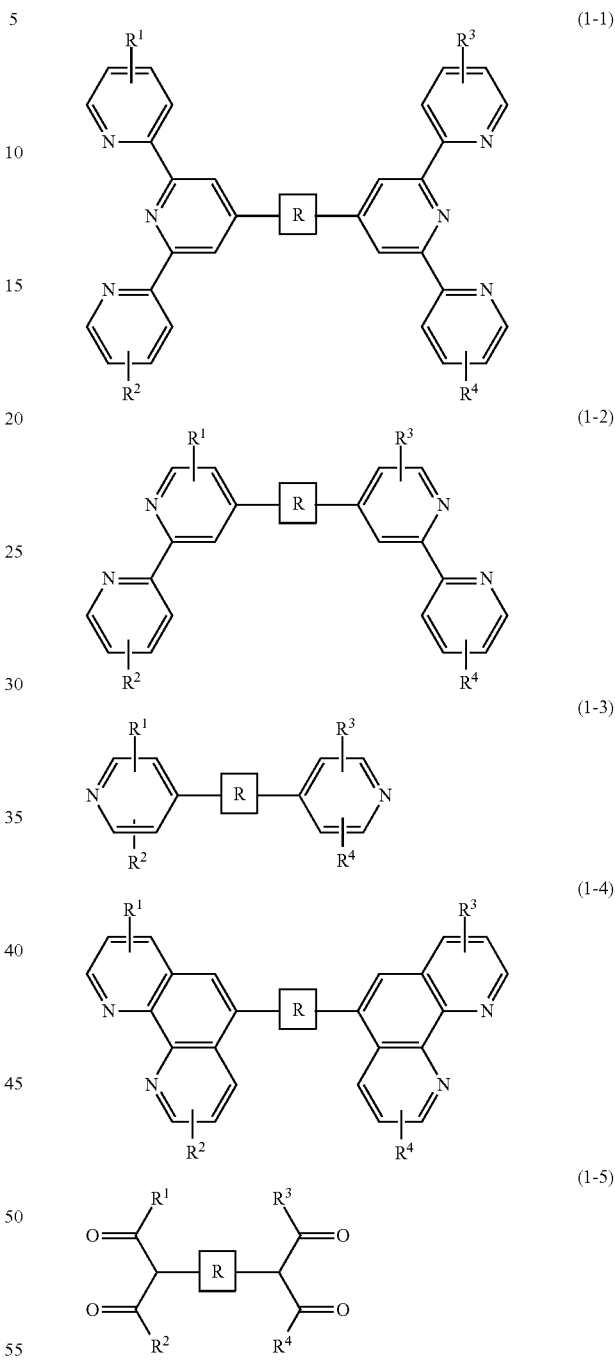

wherein R is a spacer comprising a carbon atom(s) and a hydrogen atom(s), or a spacer directly connecting two moieties independently selected from terpyridyl group, bipyridyl group, pyridyl group, phenanthrolyl group, acethylacetonato group; and $R^1$, $R^2$, $R^3$ and $R^4$ are each independently a hydrogen atom, an aryl group or an alkyl group.

In replacement of the bisterpyridine derivative, the compound where a methylene group is crosslinked between the adjacent two pyridine rings (at one or more bonding positions) may be used.

The spacer of each of formulae (1-1) to (1-5) may be a branched or linear alkylene group with a carbon number of 1 to 20 and an arylene group with a carbon number of 6 to 20 that may contain a hetero group. Examples of the spacer include arylene groups represented by each of the following formulae (2) to (5):

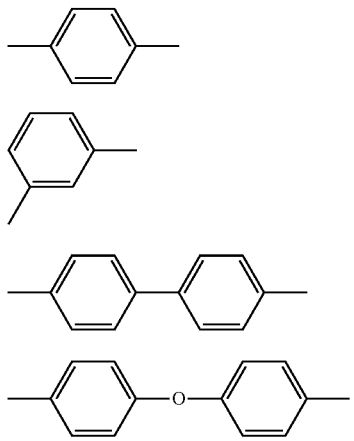

When $R^1$, $R^2$, $R^3$ and $R^4$ are each an aryl group or an alkyl group rather than a hydrogen atom, they may be a branched or linear alkyl group with a carbon number of 1 to 20 and an aryl group with a carbon number of 6 to 20 that may contain a hetero group. The aryl group or the alkyl group is not particularly limited, but examples of these groups include methyl group, ethyl group, n-butyl group, t-butyl group, phenyl group and tolyl group. The aryl group or the alkyl group may further have a substituent(s). Examples of the substituent include an alkyl group such as methyl group, ethyl group and hexyl group; an alkoxy group such as methoxy group and buthoxy group; and a halogen group such as chlorine and bromine.

Examples of the cathodically coloring metallo-supramolecular polymer include ones represented by formulae (6-1) to (6-5) where the organic ligand is a bisterpyridine derivative, a bipyridine derivative, a pyridine derivative, a phenanthroline derivative or an acetylacetone derivative, as follows:

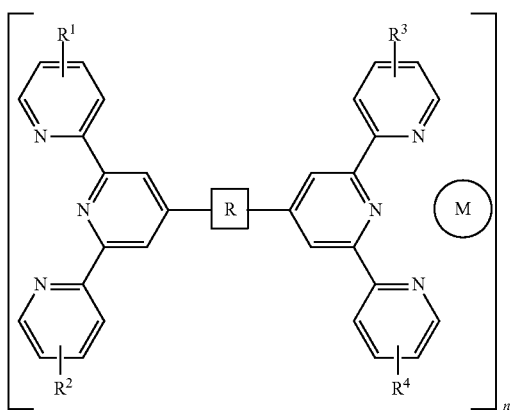

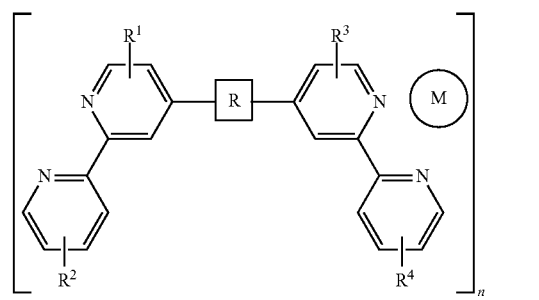

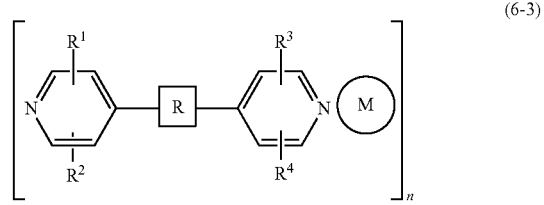

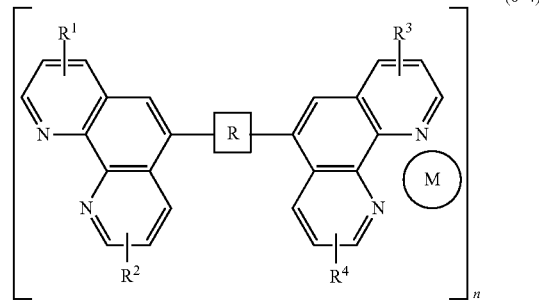

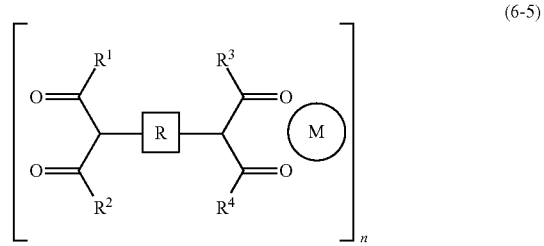

wherein $R^1$, $R^2$, $R^3$ and $R^4$ have the meanings as defined above for the bisterpyridine derivative represented by formula (1-1) and the like, M is a metal ion of at least one transition metal and/or lanthanoid metal, n is an integer of 2 or more indicating the polymerization degree.

To each of the structures of formulae (6-1) to (6-5) a counter anion (not shown) is connected. The anion has a charge corresponding to the valence of the metal ion M. The counter anion is not particularly limited, but examples of the counter anion include a halide ion such as chloride ion, hydroxide ion, acetic acid ion, perchloric acid ion, carbonate ion, boron tetrafluoride ion, hexafluoro phosphoric acid ion, trifluoromethane sulfonic acid ion, $(CF_3SO_2)_2N$ ion, a polyoxometalate ion and a combination thereof.

The cathodically coloring metallo-supramolecular polymer is not limited to the di-substituted structures. Tri-substituted, tetra-substituted structures and more-substituted structures, in addition to the di-substituted structures, can be obtained by changing the type and valence of the metal ion to be used.

The cathodically coloring metallo-supramolecular polymer can be produced by any known method.

For example, the cathodically coloring metallo-supramolecular polymer can be produced by reacting at least one organic ligand having a plurality of metal coordination positions (as exemplified above) with a metal ion of at least one transition metal and/or lanthanoid metal (as exemplified above) in an open or closed vessel (under an atmospheric or reduced pressure) in the presence or absence of an organic solvent at an elevated temperature, for example, at a temperature of 100° C. or more, usually at a temperature of 150° C. or more, for a long time period, for example, for 30 minutes to 60 hours, usually for 1 to 50 hours.

In preferable embodiments, the transition metal and/or lanthanoid metal comprises Fe and the M of the formula: $M(II)_3[Fe(III)CN_6]_2$ comprises Ni. The two thin films of Fe(II)-MEPE and NiHCF are not dissolved and electrochemically stable with $MClO_4$ (where M=Li or Na) in acetonitrile (ACN).

The electrolyte is not particularly limited, but it may be a liquid electrolyte or a solid-state electrolyte.

Examples of the liquid electrolyte include water, an alcohol such as methanol and ethanol, a carbonate such as ethylene carbonate and propylene carbonate, dimethylsulfoxide, gamma-butyrolactone, dimethylformaldehyde, tetrahydrofuran, acetonitrile, dimethylacetamide, and the like, but they are not limited as long they can dissolve other components in the ECD. Typical examples of the liquid electrolyte include acetonitrile which is sometimes abbreviated as ACN.

In preferable embodiments, the electrolyte may be a solid-state electrolyte comprising acetonitrile, a poly(methyl methacrylate) (PMMA), propylene carbonate (PC), and $MClO_4$ (where M=Li or Na). Such a solid-state electrolyte comprising acetonitrile, PMMA, PC and $MClO_4$ is utilized to prevent the leakage of ACN.

In the following paragraphs, it is described how we have developed the electrochromic device (ECD) according to the present invention while focusing on an Fe(II)-based metallo-supramolecular polymer for the working electrode, and a metal hexacyanoferrate for the counter electrode. It is then described how we have reached several types of electrolytes (especially, a special type of electrolyte) to be used for the electrochromic device (ECD) according to the present invention.

Working Electrode

According to a study, it has been reported that an MEPE synthesized by complexation of bis(terpyridine) ligand and an Fe salt (i.e., an Fe(II)-MEPE) is preferable from a viewpoint of its EC performance. The Fe(II)-MEPE thin film is blue-purple and exhibits a sharp absorbance peak at 580 nm (with $ClO_4^-$ anion) because of an MLCT between the HOMO (the highest occupied molecular orbital) of the Fe(II) ion and the LUMO (the lowest unoccupied molecular orbital) of the ligand at a steady state. Upon oxidation, the Fe(II) ion in the polymer would be oxidized into Fe(III) by the removal of a d-electron. When it occurs, the MLCT absorption disappears resulting in the bleaching of Fe(II)-MEPE thin film to a nearly colorless (light yellow) state. It has been found that an Fe(II)-MEPE is a desirable cathodically EC material for its phenomenal color change upon oxidation, short switching times, high solubility allowing solution-casting process, great stability, and high coloration efficiency.

Despite of the described fascinating properties, an Fe(II)-MEPE-based ECD with good EC performance has been hardly reported in literatures so far. There would be several possible reasons for the difficulty of utilizing an Fe(II)-MEPE in an ECD. Firstly, in a thin-film type ECD, combination of two electrochemically active thin films individually on the working electrode (WE) and the counter electrode (CE) is necessary to pursuit excellent EC performance. The two thin films in the ECD with the aforementioned configuration react simultaneously, significantly decreasing its potential window. Generally, one thin film on the WE brings a major color change. While on the CE, another thin film could serve as an ion storage layer for a smaller potential window, or a complementary EC layer that has opposite EC characteristics against the WE in order to utilize color changes of both electrodes. In brief, since an Fe(II)-MEPE is a cathodically coloring material with a remarkable color change, the CE could be anodically coloring or a ion storage layer. However, the redox potential of an Fe(II)-MEPE is relatively high among all EC materials (i.e., a formal potential of 0.755 V vs. Ag/Ag$^+$), making it hard to find a suitable CE. Secondly, owing to the high solubility of an Fe(II)-MEPE thin film in many widely used solvents for ECDs such as propylene carbonate and γ-butyrolactone, the selection of electrolyte sometimes may be limited.

As one example using an Fe(II)-MEPE in ECDs, M. Schott et al. have successfully used vanadium oxide as CE to fabricate the proposed ECD (see Schott, M.; Szczerba, W.; Posset, U.; Surca Vuk, A.; Beck, M.; Riesemeier, H.; Thunemann, A. F.; Kurth, D. G. In Operando XAFS Experiments on Flexible Electrochromic Devices Based on Fe(11)-Metallo-Supramolecular Polyelectrolytes and Vanadium Oxide. *Sol. Energy Mater. Sol. Cells* 2016, 147, 61-67). However, it still needs a potential bias of 1.6 V to operate and no stability data were provided. K. Takada et al. tried to use tri(pyridine) ligands to complex with an Fe salt, but using a commonly seen conducting substrate, indium tin oxide (ITO), instead of an ion storage layer as CE, causes large operating potentials of 3.0/−1.8 V in the proposed ECD (see Takada, K.; Sakamoto, R; Yi, S. T.; Katagiri, S.; Kambe, T.; Nishihara, H. Electrochromic Bis(terpyridine)metal Complex Nanosheets. *J. Am. Chem. Soc.* 2015, 137, 4681-4689). A Fe(II)-MEPE-based ECD with ITO as CE was previously fabricated, but a large potential bias of 2.0 V was required to operate this ECD (see Higuchi, M.; Akasaka, Y.; Ikeda, T.; Hayashi, A.; Kurth, D. G. Electrochromic Solid-State Devices Using Organic-Metallic Hybrid Polymers. *J. Inorg. Organomet. Polym.* 2009,19, 74-78). In another example, the mixture of a Ru(II)-MEPE and an Fe(II)-MEPE was used to fabricate a hybrid polymer thin film by an inkjet-printed technology (see Chen, B. H.; Kao, S. Y.; Hu, C. W.; Higuchi, M.; Ho, K. C.; Liao, Y. C. Printed Multicolor High-Contrast Electrochromic Devices. *ACS Appl. Mater. Interfaces* 2015, 7, 25069-25076). Nevertheless, lacking an ion storage layer as CE results in an operating potential bias of 3.0 V and poor stability that degraded within 400 cycles.

Alternatively, different ligands and metal ions have been used for preparation of MEPE-based ECDs and the performance has been widely studied. A bis(tridentate) ligand was complexed with an Fe ion, and an ECD based on the complex and ITO was fabricated. Although this ECD gave unique optical characteristics, still a large potential window was observed (−3/3 V). Similarly, bis(phenanthroline) and a Cu ion were combined with Fe(II)-MEPE to achieve a hybrid MEPE with two different ligands and metal ions. In an ECD composed of the proposed hybrid MEPE and ITO, potential biases of 2.4/−2.4 V were required to operate it, and this ECD decayed within 200 cycles of operation. In another study, an MEPE based on pyrazine ligand and an Fe ion was synthesized. The ECD based on this polymer with ITO was fabricated with operating potential biases of 1.6/0 V.

According to our search, only one published study by W. H. Chen et al. reported a MEPE-based ECD with CE that is different from ITO while providing a stable long-term operation (see Chen, W. H.; Chang, T. H.; Hu, C. W.; Ting, K. M.; Liao, Y. C.; Ho, K. C. An Electrochromic Device Composed of Metallo-Supramolecular Polyelectrolyte Containing Cu(I) and Polyaniline-Carbon Nanotube. *Sol. Energy Mater. Sol. Cells* 2014, 126, 219-226). They utilized a Cu-based MEPE and polyaniline in an ECD, and a stable operation of 1,500 cycles was achieved. However, still a large potential window of 1.5 V and a poor transmittance change of 21.4% were reported. In conclusion, the above discussion highlights the importance of finding a suitable CE for Fe(II)-MEPE-based ECDs or even for MEPE-based ECDs from a viewpoint of their practical applications. A candidate of the CE is required to fit the following criteria: (i) it can reduce the high potential window which causes the instability and (ii) it can increase the small optical change reported for MEPE-based ECDs. Only the solution to the above two problems can put MEPE-based ECDs into industrial applications such as smart windows and EC displays. The solution has been found out as follows and the present invention has been then completed.

Counter Electrode

Regarding the CE for an MEPE-based ECD, two major classes of thin-film EC materials, a transition-metal-oxide and a conducting polymer, have been investigated. In contrast, Prussian blue analogues (PBAs) have never been combined with an MEPE in an ECD. Thus, the present inventors targeted on these EC materials to find a suitable EC material among them as the CE for an Fe(II)-MEPE. As a crystalline EC material, Prussian blue (PB, $Fe(II)_4[Fe(III)CN_6]_3$) has been widely studied and shows exceptional color change and stability upon the oxidation of $Fe(II)CN_6^{4-}$ into $Fe(III)CN_6^{3-}$. The compound name, PBA, was defined when one or two Fe atom(s) in PB crystals was substituted by other transition metal(s). If one Fe atom is replaced, the product is called "metal hexacyanoferrate". This replacement of Fe in PBAs changes their electrochemical and optical properties, largely broadening their possibility as EC materials. However, it is important to have a bleached state that is transparent enough for an EC material. Only few PBAs fit this criterion. As a consequence of an extensive study, it has been found out that if one Fe atom is replaced by Zn, Ni, and In, a highly transparent state can be obtained during the redox reaction. Nevertheless, since the fabrication with indium replacement relies on electrodeposition but not solution-casting method, the processability is largely limited.

Accordingly, it has been finally found out that suitable examples of the CE for an MEPE-based ECD include thin films made from Prussian blue (PB), zinc hexacyanoferrate (ZnHCF), and nickel hexacyanoferrate (NiHCF).

We have further studied to find the best one for the CE for an MEPE-based ECD among the thin films made from Prussian blue (PB), zinc hexacyanoferrate (ZnHCF), and nickel hexacyanoferrate (NiHCF). Among them, nickel hexacyanoferrate (NiHCF, $Ni(II)_3[Fe(III)CN_6]_2$) was expected to be the most suitable CE for an Fe(II)-MEPE for the following reasons: (i) NiHCF is anodically coloring. The doping of the cation from an electrolyte brings a color change of an NiHCF thin film from colorless to yellow upon oxidation. Comparing to colorless ZnHCF, PB and NiHCF are both anodically coloring, which makes them better candidates as the CE for an Fe(II)-MEPE. (ii) A great long-term stability of NiHCF in ECDs can be shown. (iii) NiHCF has a relatively large capacitance among Prussian blue analogues (574.7 F g$^{-1}$) so it can easily store ions in the CE. (iv) NiHCF exhibits a high formal potential of 0.265 V (v. Ag/Ag$^+$ in acetonitrile (ACN)) comparing to PB (−0.15 V vs. Ag/Ag$^+$ in acetonitrile (ACN)). Since the oxidation potential of an ECD could be estimated as an oxidation potential of the WE minus a reduction potential of the CE ($E_{ox, ECD, estimated} = E_{ox, WE} - E_{re, CE}$), the CE with a higher redox potential is preferred. It was expected that an ECD based on an Fe(II)-MEPE and NiHCF would probably has a formal potential around 0.5 V, which is the smallest value among the published literatures. (v) Further scaling up is possible for an NiHCF thin film since it allows a solution-casting fabrication. Considering the above reasons, it was expected that using NiHCF as the CE for an MEPE-based ECD would have better performance.

As demonstrated in examples described later, it has been found that nickel hexacyanoferrate (NiHCF, $Ni(II)_3[Fe(BI)CN_6]_2$) is the most suitable CE for an Fe(II)-MEPE.

Electrolyte

Any type of electrolyte can be used for the electrochromic device (ECD) according to the present invention, including a liquid electrolyte and a solid-state electrolyte. When either of a liquid electrolyte or a solid-state electrolyte is chosen, a mixture of two or more types of the electrolytes can be used.

Non-limiting examples of the liquid electrolyte include acetonitrile. Non-limiting examples of the solid-state electrolyte include one comprising a mixture of acetonitrile, a poly(methyl methacrylate) (PMMA), propylene carbonate (PC), and MClO$_4$ (where M=Li or Na).

Regarding the leakage problem of liquid electrolytes that leads to instability, utilization of a solid-state electrolyte is more preferable for an ECD. So far, research on solid-state electrolytes has focused on two different systems: ceramic electrolytes and polymer electrolytes. Ceramic electrolytes refer to a class of solid-state materials allowing ion migration to achieve conduction, for instances, metal sulfides, metal oxides, and metal phosphates. They give a comparable ionic conductivity to the liquid electrolyte, while exhibiting exceptional stability because of the absence of volatile organic solvent. A major advantage of such ceramic electrolytes is their high-temperature durability, enabling them to be applied in fuel cells or other high-temperate electrochemical cells. However, they may have a drawback from a practical viewpoint. The fabrication of a ceramic electrolyte often relies on physical vapor deposition on a substrate. Concerning a potential damage that would be brought to EC materials and high cost during their fabrication, ceramic electrolytes have been hardly used in an ECD.

On the contrary, polymer electrolytes have been popular for EC application owing to their low cost, high flexibility, comparable ionic conductivity, and non-volatile characteristics introduced by incorporating a polymer into the liquid electrolyte that induces gelation between a solvent, a supporting electrolyte, and the polymer. Among them, a solid-state poly(ethylene oxide) (PEO) has been widely studied for its high solubility toward lithium ion, making it a desirable choice for the lithium ion battery. As for ECDs, the solubility of a polymer electrolyte toward a salt is no need to be high. Instead, high transparency is the most important criterion. To date, because of its high miscibility with a solvent that prevents the leakage, the possibility of being applied in flexible ECDs, the high transparency, and the high ionic conductivity, it is believed that a poly(methyl methacrylate) (PMMA) is desirable as a polymer matrix host in an electrolyte of ECDs among solid-state electrolytes that have been proposed so far.

More specifically, in preferred embodiments, a solid-state ECD (S-ECD) based on an Fe(II)-MEPE, NiHCF, and a PMMA-based polymer electrolyte (for example, see the configuration of an S-ECD as shown in FIG. 1) as well as an ECD with an organic liquid electrolyte, e.g., acetonitrile (L-ECD) is provided herein, although the invention is not limited to these embodiments in any manner. The scope of the invention for which the protection is to be sought by this application should be only defined by the languages of claims as appended. The first object of providing a novel electrochromic device (ECD) comprising two metal-complex-based electrochromic thin films individually acting as a working electrode and a counter electrode can be accomplished across the claimed invention.

Examples of experiments which the present inventors carried out about these specific embodiments of the invention are later described. To start with, the electrochemical and optical properties of Fe(II)-MEPE and NiHCF prepared were investigated in a three-electrode system. Sequentially, the same experiments were also conducted to study an L-ECD and an S-ECD according to the invention. The long-term stability was investigated by changing the proposed ECDs between their colored and bleached states. The polymer electrolyte in the S-ECD was expected to solve the leakage problem of ACN for better stability. Moreover, with the S-ECD serving as a sunlight-attenuated smart window, the attenuated amounts of solar irradiance were calculated for both at its colored and bleached states. Because of the reduction in the consumed energy of the S-ECD during operation, using the S-ECD could efficiently modulate indoor climate.

The present inventors' design of combining an Fe(II)-MEPE and NiHCF in an ECD has been surprisingly found out to be superior to all the reported MEPE-based ECDs in EC performance. It is believed that the proposed ECD could provide a practical example of using an Fe(II)-MEPE in ECDs for further electrochromic research and application.

EXAMPLES

Chemicals

Iron acetate ($Fe(OAc)_2$) and acetic acid ($CH_3COOH$) were purchased from Wako Chemical; isopropanol (IPA, dehydrated), ethanol (dehydrated), acetonitrile (ACN, dehydrated), and propylene carbonate (PC, dehydrated) were purchased from Kanto Chemical; 4',4''''-(1,4-phenylene)bis (2,2':6',2''-terpyridine) (bis(terpyridine) ligand), nickel(II) nitrate hexahydrate ($NiNO_3$-$6H_2O$), zinc(II) chloride ($ZnCl_2$), iron(III) nitrate nanohydrate ($Fe(NO_3)_3$-$9H_2O$), potassium ferricyanide ($K_3[Fe(CN)_6]$), sodium ferrocyanide decahydrate ($Na_4[Fe(CN)_6]$-$10H_2O$), lithium perchlorate ($LiClO_4$), and sodium perchlorate ($NaClO_4$) were purchased from Sigma-Aldrich; poly(methyl methacrylate) (PMMA, M0088) was purchased from TCI Chemical. Deionized water (DIW, 18 MΩ cm) was used throughout this study.

Synthesis of Fe(II)-MEPE

An equimolar of $Fe(OAc)_2$ (16.09 mg, 0.0925 mmol) and bis(terpyridine) ligand (50 mg, 0.0925 mmol) were refluxed at 128° C. in nitrogen-saturated $CH_3COOH$ (50 ml) for 24 h. The reacted solution was cooled to room temperature and filtered with $CH_3COOH$ to remove residual reactants and an insoluble Fe(II)-MEPE. Afterwards, the filtrate was poured onto a Petri dish and the solvent was slowly evaporated under ambient condition, and a dry brittle film of the Fe(II)-MEPE could be collected with a high yield (>90/).

Synthesis of Water-Dispersible NiHCF, PB and ZnHCF Particles

By mixing $NiNO_3$-$6H_2O$ (1.75 g) and $K_3[Fe(CN)_6]$ (1.32 g) in 30 ml DIW, a brown NiHCF precipitant was generated immediately. After 5 min of vigorous stir, the solution was centrifuged at 6,000 rpm for 5 min and an upper-clean solution containing residual reactants was removed. Sequentially, another 30 ml DIW was added thereto and the resultant was stirred 3 times in the beginning to ensure no remaining reactants. Afterwards, 0.39 g of $Na_4[Fe(CN)_6]$-$10H_2O$ in 50 ml DIW was mixed with the brown NiHCF precipitant as a surface modifier. After 3 days of stir, the NiHCF was slowly downsized to nano scale, increasing its water-dispersion ability. The solution was dried by a rotary evaporator at 40° C. to remove DIW. Eventually, brown NiHCF particles were obtained. Synthesis processes of PB and ZnHCF were also carried out in a manner similar to the above steps. As for PB, 3.23 g $Fe(N_3)_3$-$9H_2O$ and 2.90 g $Na_4[Fe(CN)_6]$-$10H_2O$ were mixed, and 0.542 g $Na_4[Fe(CN)_6]$-$10H_2O$ was added thereto subsequently as a surface modifier. As for ZnHCF, 0.545 g $ZnCl_2$ and 0.968 g $Na_4[Fe(CN)_6]$-$10H_2O$ were mixed with a surface modifier (0.232 g $Na_4[Fe(CN)_6]$-$10H_2O$).

Fabrication of Fe(II)-MEPE, PB, NiHCF and ZnHCF Thin Films

Figure 2A:
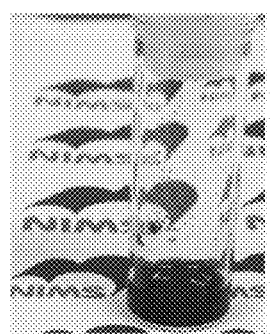
FIG. 2A shows a solution of the Fe(II)-MEPE dispersed in ethanol (5 mg/ml)
Figure 2B:
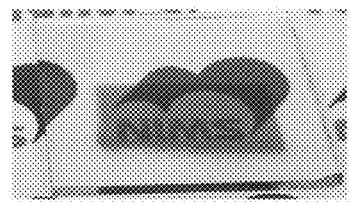
FIG. 2B shows the just-fabricated Fe(II)-MEPE thin film.
Figure 2C:
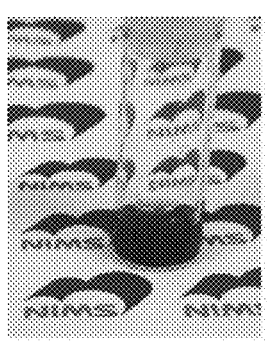
FIG. 2C shows a solution of the NiHCF dispersed in DIW (75 mg/ml)
Figure 2D:
FIG. 2D shows the just-fabricated NiHCF thin film.

To cast the Fe(II)-MEPE onto ITO-coated glass, it was dispersed in ethanol at a concentration of 5 mg/ml (see FIG. 2A). Before casting, the ITO-coated glass (Sigma-Aldrich, 8~12 Ω/square) with an area of 2.5×2.5 cm$^2$ was subjected to an ultrasonic treatment in IPA for 15 min. 20 μl of the Fe(II)-MEPE-dispersed solution was dropped and spin-coated onto the cleaned ITO-coated glass at 40 rpm for 10 min. As a result, a blue thin film of the Fe(II)-MEPE was obtained and its active area was controlled at 1.5×1.0 cm$^2$ by cotton swab (see FIG. 2B). For the fabrication of PB, NiHCF and ZnHCF thin films, the ITO-coated glass (2.5×2.5 cm$^2$) was subjected to an ultrasonic treatment in IPA for 15 min and further cleaned by a UV-ozone cleaner to make the glass more hydrophilic. PBAs particles were dispersed in DIW at a concentration of 75 mg/ml (see FIG. 2C for the NiHCF particles) and 40 μl of this solution was dropped and spin-coated at 1,500 rpm for 30 s. Subsequently, the active area of each of the PBAs thin films was controlled at 1.5×1.0 cm$^2$ (see FIG. 2D for the NiHCF thin film).

Fabrication of PMMA-Based Polymer Electrolyte

Figure 3A:
FIG. 3A shows a photo of the polymer electrolyte and FIG. 3B shows transmittance spectra of the sandwiched configuration of ITO/the polymer electrolyte/ITO.
Figure 3B:
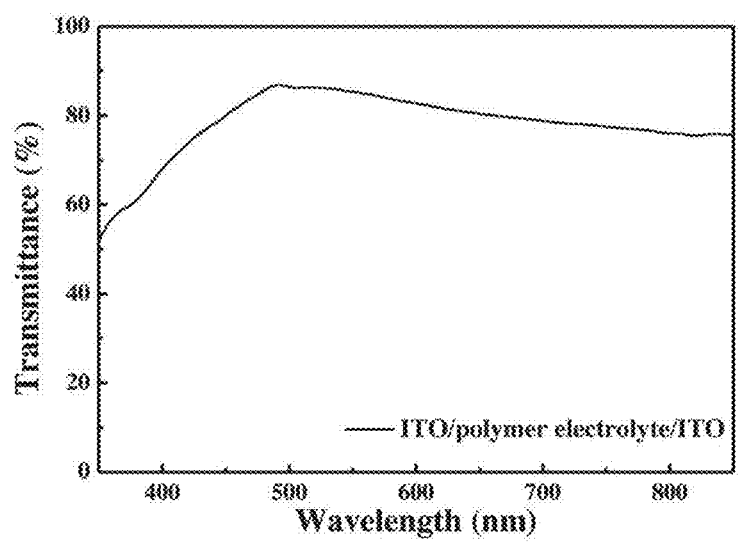

A PMMA-based polymer electrolyte was prepared from 3.0 wt % $NaClO_4$ (i.e., a supporting electrolyte), 25.0 wt % PC (i.e., a plasticizer), 57.0 wt % ACN (i.e., a solvent), and 15.0 wt % PMMA (i.e., a polymer matrix). Firstly, 0.9 g $NaClO_4$ was added in a mixed solution of 17.1 g ACN (21.8 ml) and 7.5 g PC (6.2 ml). After stirring for 30 min until $NaClO_4$ was completely dissolved, 4.5 g PMMA was added into the solution while vigorously stirring to prevent aggregation of the PMMA. The gel-like mixture was stirred for another 24 h in a vial and a solid-state polymer electrolyte was obtained. A photo (FIG. 3A) and transmittance spectra (FIG. 3B) of the polymer electrolyte show solid-state characteristics and high transparency.

Fabrication of L-ECDs, S-ECD, and Fe(II)-MEPE/ITO ECD

In this study, the Fe(II)-MEPE was always used as the WE in ECDs. Regarding the CE, the NiHCF was used in L-ECDs and S-ECD while ITO-coated glass was used in the Fe(II)-MEPE/ITO ECD. Cell gaps of the ECDs were controlled at 60 μm by Surlyn® (60 μm, Solaronix S. A., Aubonne, Switzerland). For each of the L-ECDs and the Fe(II)-MEPE/ITO ECD, Surlyn® was firstly attached and surrounded the active area of the WE. After that, it was sandwiched with the CE and heated at 60° C. to solidify Surlyn®. Then, an electrolyte (0.1 M LiClO$_4$ or NaClO$_4$ in ACN) was injected into the gaps on Surlyn® that were cut beforehand. For the S-ECD, the WE, Surlyn®, the PMMA-based polymer electrolyte, and the CE were directly sandwiched in the described order and heated at 60° C. to solidify Surlyn®.

Measurements

All electrochemical and optical measurements were carried out on a home-made platform composed of a potentiostat/galvanostat electrochemical workstation (CHI612, CH Instruments, Inc.) and a UV-vis spectrophotometer (DH-2000-BAL, Ocean Optics). In a three-electrode system made in our home-made cell (with a gap between WE and CE=1 cm), the interested film was used as the WE and a Pt wire as the CE. An Ag/Ag$^+$ electrode (available from BAS industry) with 0.1 M tetrabutylammonium perchlorate (TBAP) and 0.1 M silver nitrate (AgNO$_3$) in ACN serves as a reference electrode. Crystallinity of the NiHCF particles was investigated by X-ray diffraction patterns (using an XRD instrument, X-Pert available from the Netherlands).

Material Characterizations

Figure 4A:
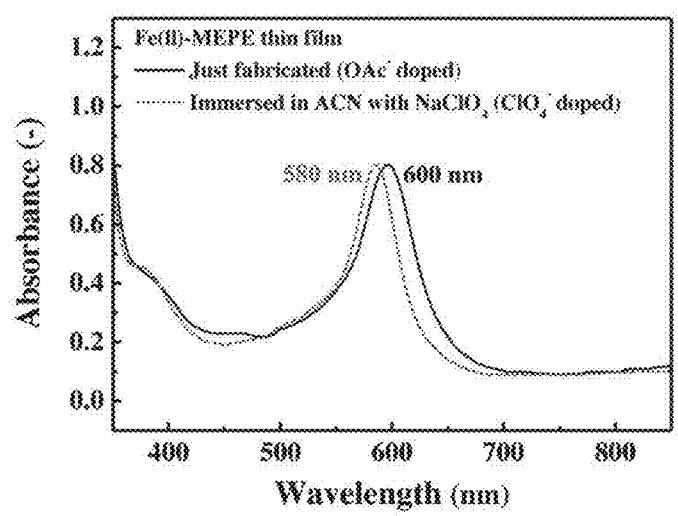
FIG. 4A shows absorbance spectra of the just-fabricated Fe(II)-MEPE thin film (OAc doped) and the Fe(II)-MEPE thin film immersed in ACN with 0.1 M $NaClO_4$ ($ClO_4$ doped)
Figure 4B:
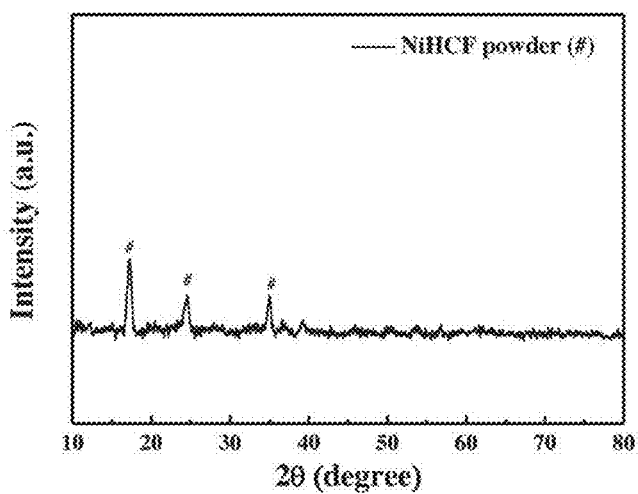
FIG. 4B shows an XRD pattern of the NiHCF particles.

Absorbance spectra of the just-fabricated Fe(II)-MEPE thin film (OAc$^-$ doped), and the Fe(II)-MEPE thin film immersed in ACN with 0.1 M NaClO$_4$ (ClO$_4^-$ doped) are presented in FIG. 4A. A sharp absorbance peak of the Fe(II)-MEPE thin film was observed at 600 nm (OAc$^-$ doped) and shifted to 580 nm when dipped in ACN with NaClO$_4$ (ClO$_4^-$ doped), indicating an MLCT absorption between the HOMO of Fe(II) and the LUMO of ligand in Fe(II)-MEPE. The absorbance peak at 580 nm suggests successful synthesis of the Fe(II)-MEPE, which is supported by some literatures (see Han, F. S.; Higuchi, M.; Kurth, D. G. Metallo-Supramolecular Polyelectrolytes Self-assembled from Various Pyridine Ring Substituted Bis-terpyridines and Metal Ions: Photophysical, Electrochemical and Electrochromic Properties. *J. Am. Chem. Soc.* 2008, 130, 2073-2081; and Schott, M.; Szczerba, W.; Posset, U.; Surca Vuk, A.; Beck, M.; Riesemeier, H.; Thunemann, A. F.; Kurth, D. G. In Operando XAFS Experiments on Flexible Electrochromic Devices Based on Fe(II)-Metallo-Supramolecular Polyelectrolytes and Vanadium Oxide. *Sol. Energy Mater. Sol. Cells* 2016, 147, 61-67). This observation about the peak shift is also supported by the reported absorbance peaks shift of MEPE in ACN with different anions (see Zhang, J.; Hsu, C. Y.; Higuchi, M. Anion Effects to Electrochromic Properties of Ru-based Metallo-Supramolecular Polymers, *J. Photopolym. Sci. Technol.* 2014, 27, 297-300). As for the NiHCF thin film, the structure was demonstrated because of the characteristic peaks at 2θ of 17.3, 24.6, and 35.0° in the XRD pattern (see FIG. 4B), which was supported by some literatures (see Gotoh, A.; Uchida, H.; Ishizaki, M.; Satoh, T; Kaga, S.; Okamoto, S.; Ohta, M.; Sakamoto, M.; Kawamoto, T.; Tanaka, H.; Tokumoto, M.; Hara, S.; Shiozaki, H.; Yamada, M.; Miyake, M.; Kurihara, M. Simple Synthesis of Three Primary Colour Nanoparticle Inks of Prussian Blue and Its Analogues. *Nanotechnology* 2007, 18, 345609; and Kelly, M. T.; Arbuckle-Kel, G. A.; Johnson, L. A.; Su, E. Y.; Amos, L. J.; Chun, J. K. M.; Bocarsly, A. B. Nickel Ferrocyanide Modified Electrodes as Active Cation-Exchange Matrices: Real Time XRD Evaluation of Overlayer Structure and Electrochemical Behavior. *J. Electroanal. Chem.* 2001, 500, 311-321).

Characterizations of Electrochemical Properties in a Three-Electrode System

Figure 5A:
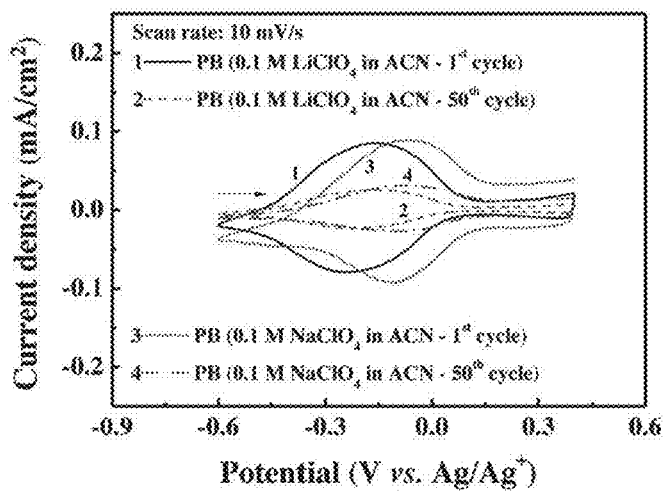
FIG. 5A shows CVs of the PB thin film with 0.1 M $LiClO_4$ and 0.1 M $NaClO_4$ in ACN for 1 and 50 cycles at a scan rate of 10 mV/s.
Figure 5B:
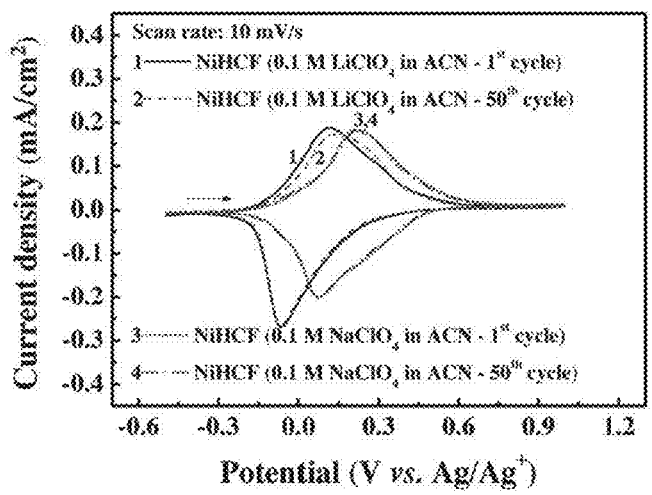
FIG. 5B shows CVs of the NiHCF thin film with 0.1 M $LiClO_4$ and 0.1 M $NaClO_4$ in ACN for 1 and 50 cycles at a scan rate of 10 mV/s.
Figure 5C:
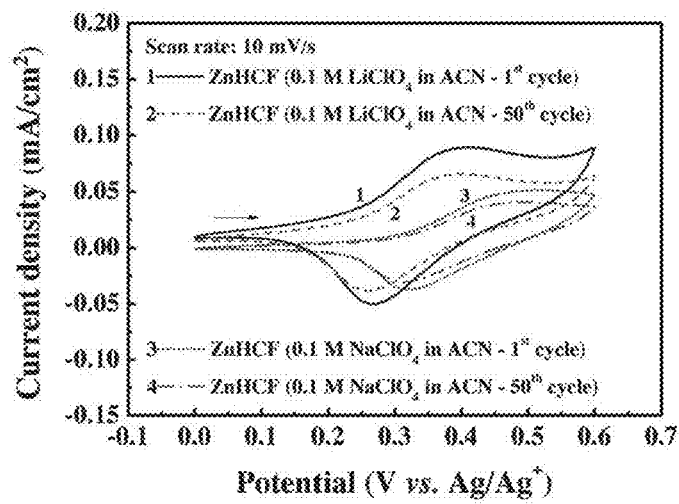
FIG. 5C shows CVs of the ZnHCF thin film with 0.1 M $LiClO_4$ and 0.1 M $NaClO_4$ in ACN for 1 and 50 cycles at a scan rate of 10 mV/s.
Figure 6:
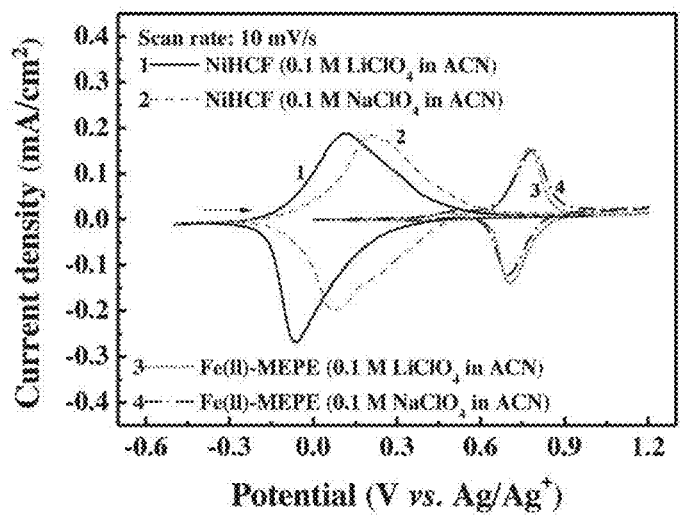
FIG. 6 shows CVs of the NiHCF thin film with 0.1 M $LiClO_4$ and 0.1 M $NaClO_4$ in ACN, and the Fe(II)-MEPE thin film with 0.1 M $LiClO_4$ and 0.1 M $NaClO_4$ in ACN at a scan rate of 10 mV/s.

To investigate electrochemical properties of interested thin films, cyclic voltammograms (CVs) were performed in a three-electrode system (see FIGS. 5 and 6). Since the Fe(II)-MEPE thin film is stable in ACN, we decided to use ACN with different supporting electrolytes for the investigation. Regarding the supporting electrolytes, an alkali metal cation is generally used for electrochemical analysis of NiHCF. According to a literature, the electrochemical activity of NiHCF shows an apparent preference on Li and Na rather than K in ACN. Considering the use of ClO$_4^-$ anion for Fe(II)-MEPE in a previous study, LiClO$_4$ and NaClO$_4$ were selected as the supporting electrolytes. Even though there are several advantages for using NiHCF as the CE for a MEPE-based ECD, we still need to inspect other PBAs to distinguish NiHCF from them. In FIGS. 5A, 5B, and 5C, CVs of three commonly seen PBAs (PB, NiHCF, and ZnHCF) were recorded in different electrolytes (0.1 M LiClO$_4$ and 0.1 M NaClO$_4$ in ACN) at a scan rate of 10 mV/s. The 1st and the 50th cycles of CVs were compared with each other for their stability after the continuous operation of 50 cycles. For the PB thin film, the electrochemical activity, or the charge density stored in the thin film, was significantly decayed after 50th cycles (see FIG. 5A). Since the purpose of a CE is to store ions for a WE, the results in FIG. 5A indicate that PB was not especially excellent for a CE in an ACN-based electrolyte. As for the NiHCF thin film (FIG. 5B), it shows desirable stability in the two tested electrolytes, implying its potential to be utilized as a CE for an MEPE-based ECD. On the other hand, for the ZnHCF thin film, its charge density declined with 0.1 M LiClO$_4$ in ACN after 50 cycles (see FIG. 5C). On the contrary, it showed relatively good stability with 0.1 M NaClO$_4$ in ACN. However, its charge density was small. The three types of chemical compounds are still considered to be relatively practically useful as discussed above; however, in view of these experimental results, we decided to try to further investigate the NiHCF thin film as a CE for an MEPE-based ECD.

Here are the data of redox potentials ($E_{ox}$ and $E_{red}$) in 0.1 M NaClO$_4$/ACN (from FIGS. 5A, B and C).

|  | $E_{ox}$ | $E_{red}$ | Formal potential (($E_{ox}$ + $E_{red}$)/2) |
|---|---|---|---|
| PB | −0.063 V | −0.113 V | −0.088 V |
| NiHCF | 0.211 V | 0.077 V | 0.144 V |
| ZnHCF | 0.511 V | 0.322 V | 0.416 V |

Note:

The redox potential of NiHCF is different from the literature value cited herein (0.265V).

This discrepancy may come from the electrolyte, film thickness, and measurement system.

In CVs of the Fe(II)-MEPE thin film (see FIG. 6), a redox reaction could happen, which is described by the following Equation (1) where a generated positive charge upon oxidation of Fe(II) is compensated by the doping of an anion (ClO$_4^-$).

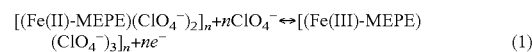

$$[(Fe(II)\text{-}MEPE)(ClO_4^-)_2]_n + nClO_4^- \leftrightarrow [(Fe(III)\text{-}MEPE)(ClO_4^-)_3]_n + ne^- \quad (1)$$

In CVs of the NiHCF thin film (see FIG. 6), a redox reaction involving the oxidation of Fe(II)CN$_6^{4-}$ into Fe(III)

$CN_6^{3-}$ and the doping of alkali metal cations (M, M=Li or Na) could happen, which is presented in the following Equation (2).

$$M_2Ni(II)_3[Fe(II)CN_6]_2 \leftrightarrow Ni(II)_3[Fe(III)CN_6]_2 + 2e^- + 2M^+ \quad (2)$$

The CVs of the Fe(II)-MEPE thin film show similar electrochemical characteristics despite of the use of different types of anions in the supporting electrolytes. Secondly, although the preference of cation for Fe(II)-MEPE has not been studied before, the variation of anion could dominate electrochemical properties of the MEPE. Combining the above two facts, the redox reaction of the Fe(II)-MEPE thin film could be majorly influenced by the doping of the anions, as described in Equation (1). Concerning the NiHCF thin film, our results appear to show that the redox potential with $NaClO_4$ was larger than that with $LiClO_4$ in ACN. Additionally, the estimated redox potential in an ECD can be represented as: $E_{ox, ECD, estimated} = E_{ox, WE} - E_{re, CE}$, where $E_{ox, ECD, estimated}$ is an estimated oxidation potential of the ECD, $E_{ox, WE}$ and $E_{re, CE}$ are an oxidation potential of the WE and a reduction potential of the CE, respectively. Thus, the CE with a higher redox potential is more favorable in order to minimize the operating potential of an Fe(II)-MEPE-based ECD. Therefore, $NaClO_4$ was decided to be the most suitable supporting electrolyte in the ECD owing to the larger redox potential of the NiHCF thin film with $NaClO_4$. In other words, $LiClO_4$ is still considered a useful supporting electrolyte, but the above results revealed that $NaClO_4$ would be further better than $LiClO_4$.

Figure 7:
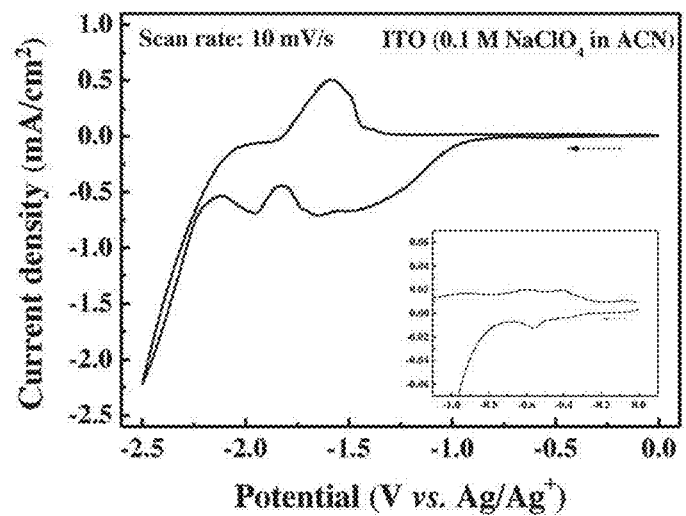
FIG. 7 shows CV of ITO with 0.1 M $NaClO_4$ in ACN at a scan rate of 10 mV/s.

CV of ITO with 0.1 M $NaClO_4$ in ACN in a three-electrode system was performed, which reflects electrochemical characteristics of tin oxide (see FIG. 7). In FIG. 7, the cathodic peak at −0.58 V indicates the reduction of tin oxide, while the increasing cathodic current at a smaller potential (<−1.0 V) could probably be attributed to a side reaction generated in the electrolyte since this reaction was not reversible and the current was extremely large.

Optical Characterizations in a Three-Electrode System

Figure 8A:
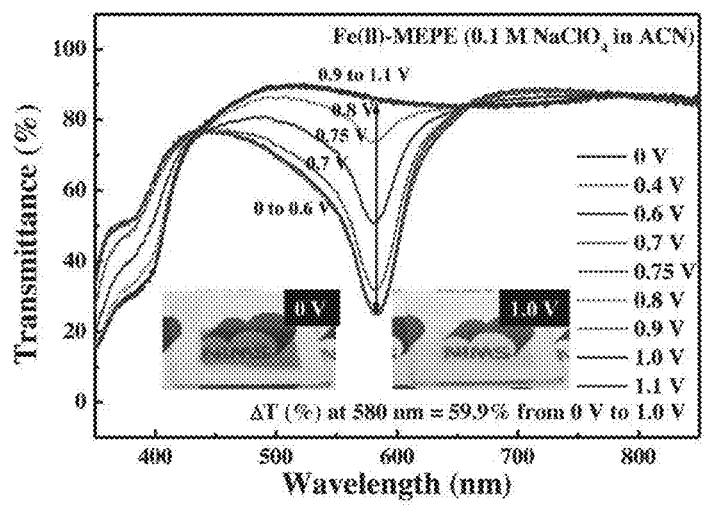
FIG. 8A shows transmittance spectra of the Fe(II)-MEPE thin film at various potential biases.

As shown in transmittance spectra of the Fe(II)-MEPE thin film seen in FIG. 8A, an MLCT absorption between the Fe(II) ion and the ligand disappeared upon oxidation. At 580 nm, the largest ΔT of 59.9% was caused by the transmittance at a colored state ($T_c$, 25.7%) to a bleached state ($T_b$, 85.6%), as shown in Table 1 below. A color change from blue-purple (colored state, 0 V) to light-yellow (bleached state, 1.0 V) was also observed. Additionally, the optical density change (ΔOD, ΔOD=log($T_b/T_c$)) of the Fe(II)-MEPE thin film (0.523) at 580 nm was calculated (see Table 1). This value could represent the absolute amount of color change generated by the EC material, which enables us to compare the color change in different systems.

TABLE 1

Some key EC performance at 580 nm of the Fe(II)-MEPE thin film, the L-ECD (0.1 M $NaClO_4$), the S-ECD, and the Fe(II)-MEPE/ITO ECD.

| System | $T_b$ (%) | $T_c$ (%) | ΔT (%) | ΔOD | $t_b^a$ (s) | $t_c^a$ (s) |
|---|---|---|---|---|---|---|
| Fe(II)-MEPE thin film | 85.6 (0 V) | 25.7 (1.0 V) | 59.9 | 0.523 | 0.61 | 0.33 |
| L-ECD (0.1 M $NaClO_4$) | 74.3 (0.8 V) | 23.1 (0 V) | 51.2 | 0.507 | 0.98 | 0.43 |

TABLE 1-continued

Some key EC performance at 580 nm of the Fe(II)-MEPE thin film, the L-ECD (0.1 M $NaClO_4$), the S-ECD, and the Fe(II)-MEPE/ITO ECD.

| System | $T_b$ (%) | $T_c$ (%) | ΔT (%) | ΔOD | $t_b^a$ (s) | $t_c^a$ (s) |
|---|---|---|---|---|---|---|
| S-ECD | 67.2 (0.8 V) | 22.1 (0 V) | 45.1 | 0.483 | 1.03 | 0.52 |
| Fe(11)-MEPE/ITO ECD | 65.5 (2.5 V) | 22.2 (0 V) | 43.3 | 0.470 | 7.68 | 1.67 |

$^a$:$t_b$ and $t_c$ are each defined as a required time to reach 95% of ΔT.

Figure 8B:
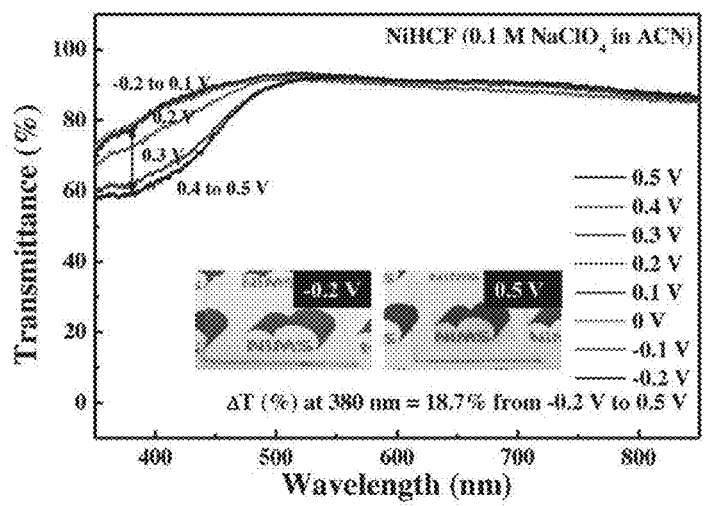
FIG. 8B shows transmittance spectra of the NiHCF thin film at various potential biases.

On the other hand, when $Fe(II)CN_6^{4-}$ was oxidized into $Fe(II)CN_6^{3-}$, the color of the NiHCF thin film changed from transparent (−0.2 V) to yellow (0.5 V) (see FIG. 8B). Although the NiHCF thin film exhibited the largest ΔT of 18.7% at 380 nm, this wavelength was not useful since the Fe(II)-MEPE thin film was also anodically coloring at 380 nm (see FIG. 8A). Instead, the wavelength 450 nm was selected as the characteristic absorption of the NiHCF thin film to demonstrate its color change in the ECD. As seen from the data recorded in Table 2 at 450 nm, the NiHCF thin film had a ΔT of 13.8% from the transmittance at a bleached state (89.1%) to a colored state (75.3%) with a ΔOD of 0.076.

TABLE 2

Some key EC performance at 450 nm of the NiHCF thin film and the Fe(II)-MEPE thin film, and the L-EDC (0.1M $NaClO_4$), the S-ECD, and the Fe(II)-MEPE/ITO ECD.

| System | $T_b$ (%) | $T_c$ (%) | ΔT (%) | ΔOD |
|---|---|---|---|---|
| Fe(II)-MEPE thin film | 80.4 (0 V) | 77.6 (1.0 V) | 2.8 | 0.015 |
| NiHCF thin film | 89.1 (−0.2 V) | 75.3 (0.5 V) | 13.8 | 0.076 |
| L-ECD (0.1M $NaClO_4$) | 66.4 (0.8 V) | 58.7 (0 V) | 7.7 | 0.054 |
| S-ECD | 72.5 (0.8 V) | 63.9 (0 V) | 8.6 | 0.055 |
| Fe(II)-MEPE/ITO ECD | 62.7 (2.2 V) | 58.3 (0 V) | 4.4 | 0.031 |

Figure 9:
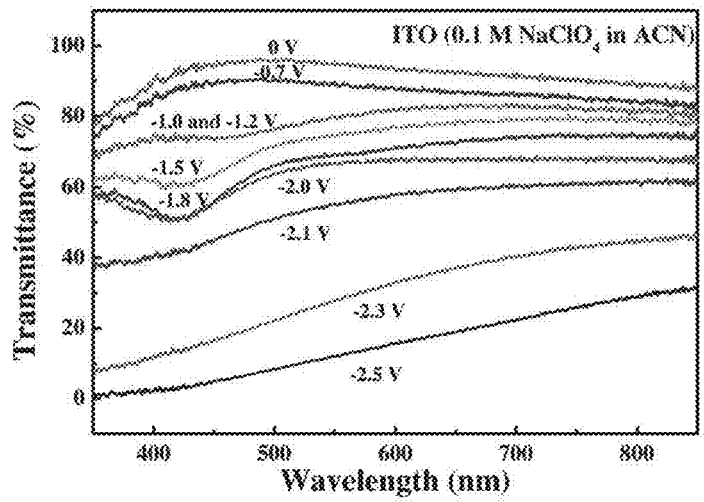
FIG. 9 shows transmittance spectra of ITO at various potential biases.

To emphasize importance of utilizing a suitable CE, transmittance response values of ITO were also examined, and transmittance spectra of ITO were shown in FIG. 9. It shows the cathodically coloring characteristics upon various potential biases with an onset at −0.7 V that corresponds to the reduction of tin oxide. Since the Fe(II)-MEPE was also cathodically coloring, it was expected that using ITO as the CE in the Fe(II)-MEPE-based ECD would give lower transparency at a bleached state.

Figure 10A:
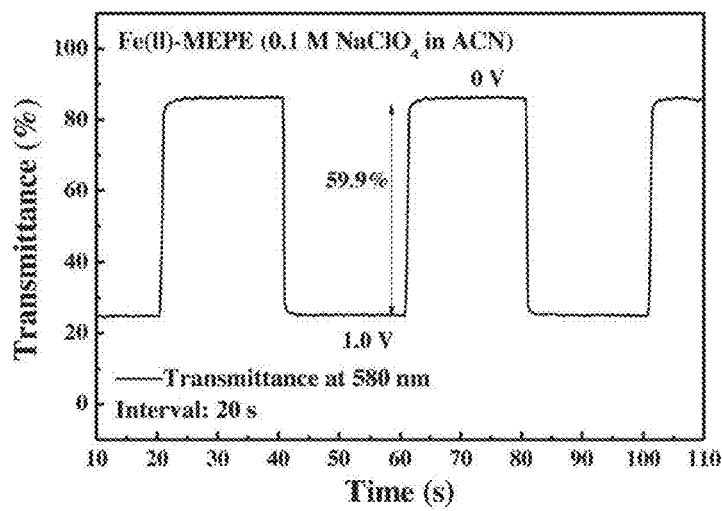
FIG. 10A shows dynamic transmittance response values of the Fe(II)-MEPE thin film from 0 V (colored state) to 1.0 V (bleached state) at 580 nm.
Figure 10B:
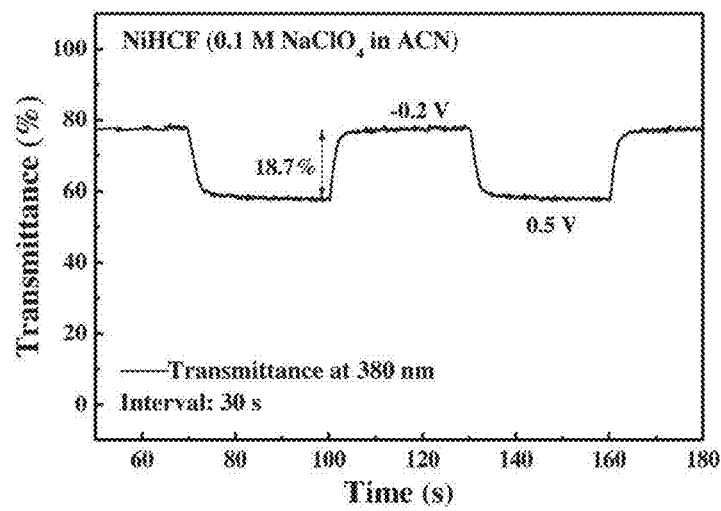
FIG. 10B shows dynamic transmittance response values of the NiHCF thin film from −0.2 V (bleached state) to 0.5 V (colored state) at 380 nm.

Dynamic transmittance response values between the colored and bleached states of the Fe(II)-MEPE thin film and the NiHCF thin film at their largest optical changes (580 and 380 nm) are shown in FIG. 10A and FIG. 10B, respectively. As seen in Table 1, between its colored state (0 V) and bleached state (1.0 V), the Fe(II)-MEPE thin film exhibited short switching times of 0.61 s in bleaching ($t_b$) and 0.33 s in coloring ($t_c$), which is desirable for an EC display or a smart window from a viewpoint of comfortableness for users. In comparison, the NiHCF thin film had relatively low switching times (2.56 s in bleaching and 3.61 s in coloring) when it was operated between −0.2 V (bleached state) and 0.5 V (colored state).

Electrochemical Characterizations of ECDs

Four ECDs were prepared with the following configurations: the L-ECD (0.1 M $LiClO_4$); the L-ECD (0.1 M NaClO$_4$); the S-ECD; and the Fe(II)-MEPE/ITO ECD. CVs of the L-ECDs and the S-ECD are presented in FIG. 11 while their peak potential data are shown in Table 3. Since the Fe(II)-MEPE and the NiHCF were assigned to the WE and the CE, respectively, potential values of these ECDs were estimated as the Fe(II)-MEPE vs. the NiHCF.

TABLE 3

Peak potential values in CVs of the NiHCF thin film and the Fe(II)-MEPE thin film in a three-electrode system, and the L-ECDs, the S-ECD, and the Fe(II)-MEPE/ITO ECD

| System | Electrolyte | $E_{p,a}{}^a$ (V) | $E_{p,c}{}^a$ (V) |
|---|---|---|---|
| NiHCF thin film | 0.1M LiClO$_4$ in ACN | 0.112 | −0.067 |
| NiHCF thin film | 0.1M NaClO$_4$ in ACN | 0.214 | 0.078 |
| Fe(II)-MEPE thin film | 0.1M LiClO$_4$ in ACN | 0.778 | 0.708 |
| Fe(II)-MEPE thin film | 0.1M NaClO$_4$ in ACN | 0.785 | 0.695 |
| L-ECD (0.1M LiClO$_4$) | 0.1M LiClO$_4$ in ACN | 0.663 | 0.609 |
| L-ECD (0.1M NaClO$_4$) | 0.1M NaClO$_4$ in ACN | 0.565 | 0.512 |
| S-ECD | Polymer electrolyte | 0.644 | 0.571 |
| Fe(II)-MEPE/ITO ECD | 0.1M NaClO$_4$ in ACN | 2.565 | —$^b$ |

$^a E_{p,a}$: Anodic peak potential; $E_{p,c}$: Cathodic peak potential;
$^b$ No apparent cathodic peak.

Figure 11:
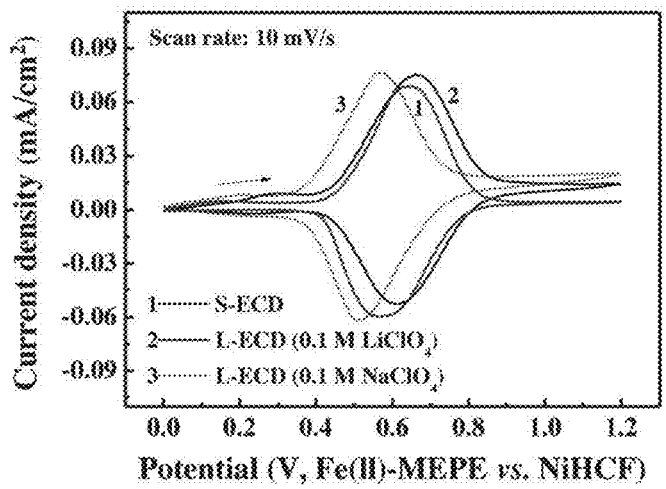
FIG. 11 shows CVs of the L-ECD (0.1 M $LiClO_4$), the L-ECD (0.1 M $NaClO_4$), and the S-ECD at a scan rate of 10 mV/s.

In FIG. 11, a redox reaction of the Fe(II)-MEPE could be demonstrated in all of the three ECDs owing to the color change from blue-purple to light-yellow upon oxidation. Secondly, since redox potential values of the L-ECDs and S-ECD (see FIG. 11) were much smaller than the Fe(II)-MEPE/ITO ECD (see FIG. 12), it is reasonable to assume that the NiHCF took part in the redox reaction. Therefore, as the chemical reaction scheme, the following Equation (3) can be proposed, where M represents Li or Na:

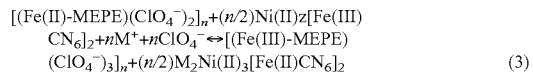

$$[(Fe(II)\text{-}MEPE)(ClO_4^-)_2]_n + (n/2)Ni(II)z[Fe(III)CN_6]_2 + nM^+ + nClO_4^- \leftrightarrow [(Fe(III)\text{-}MEPE)(ClO_4^-)_3]_n + (n/2)M_2Ni(II)_3[Fe(II)CN_6]_2 \quad (3)$$

As presented in FIG. 11, the L-ECD (0.1 M NaClO$_4$) clearly exhibited a smaller redox potential than the L-ECD (0.1 M LiClO$_4$). According to a previous study, it was expected that the redox potential in an ECD would follow the equation of: $E_{ox,\ ECD,\ estimated}=E_{ox,\ WE}-E_{re,\ CE}$. Thus, the higher redox potential of the NiHCF thin film with 0.1 M NaClO$_4$ in ACN supports the smaller redox potential of the L-ECD (0.1 M NaClO$_4$). Since a smaller redox potential is preferred, we decided to use the L-ECD (0.1 M NaClO$_4$) for further optical characterizations. As for the S-ECD, an increase in the redox potential was caused by the polymer electrolyte as compared with the L-ECD (0.1 M NaClO$_4$) (see FIG. 11). Because the ionic conductivity of a PMMA-based polymer electrolyte (from $5\times10^{-3}$ to $5\times10^{-5}$ (S/cm)) is lower than a liquid electrolyte ($10^{-2}$ (S/cm)), the S-ECD would probably have a higher redox potential than the L-ECD (0.1 M NaClO$_4$).

Figure 12:
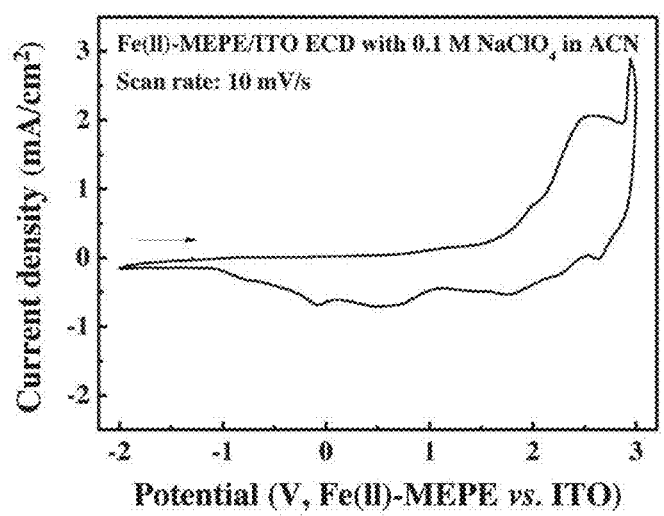
FIG. 12 shows CV of the Fe(II)-MEPE/ITO ECD at a scan rate of 10 mV/s.

Apart from the L-ECDs and the S-ECD, CV of the Fe(U)-MEPE/ITO ECD was performed to investigate an ECD without NiHCF as CE (see FIG. 12). Comparing to the anodic peaks of the ECDs using NiHCF as CE ($E_{p,a}<0.7$ V, Table 3), the Fe(II)-MEPE/ITO ECD had a much higher anodic peak potential of 2.565 V. Since the current density of the first reduction reaction of ITO with a cathodic peak at −0.58 V was quite small. It is believed that the oxidation of the Fe(II)-MEPE thin film ($E_{p,a}=0.785$ V) occurred with the previously mentioned side reaction of ITO ($<-1.0$ V) presented in FIG. 7, which resulted in such a high anodic peak potential of the Fe(U)-MEPE/ITO ECD.

Optical Characterizations of ECDs

Figure 13A:
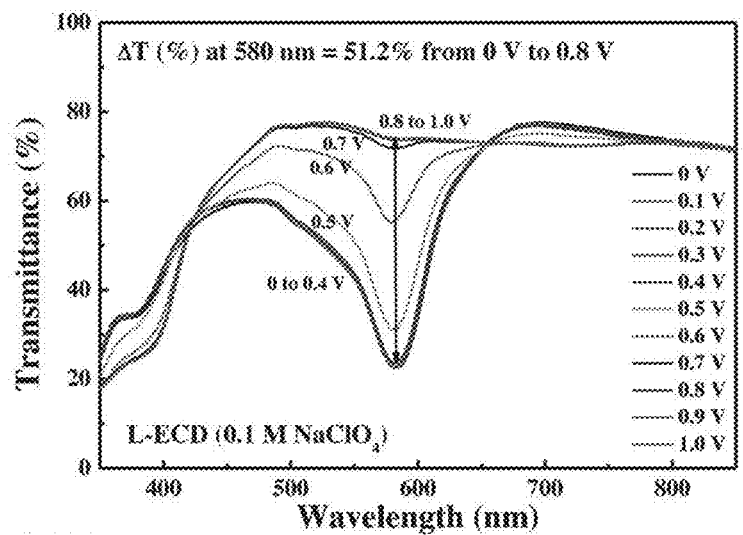
FIG. 13A shows transmittance spectra of the L-ECD (0.1 M $NaClO_4$) at various potential biases.

Transmittance spectra of the L-ECD (0.1 M NaClO$_4$) in FIG. 13A show that it could be bleached with a small potential bias of 0.8 V. Additionally, this ECD exhibited a large $\Delta T$ of 51.2% at 580 nm (see Table 1) with a color change from blue-purple (0 V) to light-yellow (0.8 V). By using the values $T_b$(74.3%) and $T_c$ (23.1%) at 580 nm (see Table 1), a $\Delta OD$ of 0.507 could be calculated. In contrast, the Fe(II)-MEPE thin film had a $\Delta OD$ of 0.527 with a $T_b$ of 85.6% and a $T_c$ of 25.7%. The difference of $\Delta OD$ between the two systems was minor, indicating that the L-ECD (0.1 M NaClO$_4$) could nearly use all optical changes of the Fe(II)-MEPE thin film. The lower $T_b$ was because two ITO-coated glass plates were used in the ECD instead of only one in a three-electrode system. The decrease in $T_b$ also resulted in a smaller $\Delta T$ in the L-ECD (0.1 M NaClO$_4$). In addition, to prove whether the NiHCF could react with the Fe(II)-MEPE in the L-ECD (0.1 M NaClO$_4$), EC performance at 450 nm of the NiHCF thin film, the Fe(II)-MEPE thin film, and the L-ECD (0.1 M NaClO$_4$) was recorded in Table 2. Since the Fe(II)-MEPE thin film exhibited a small $\Delta OD$ (0.015) at 450 nm comparing to the value of the NiHCF thin film (0.076), the $\Delta OD$ of the L-ECD (0.1 M NaClO$_4$) at 450 nm (0.054) was mostly contributed by the NiHCF thin film. This fact supports that the redox reaction in FIG. 11 was based on the reaction of both the NiHCF and the Fe(II)-MEPE, as illustrated in Equation (3). Regarding the small operating potential (0.8 V) and the large $\Delta T$, the L-ECD (0.1 M NaClO$_4$) is promising, but the leakage problem of ACN would probably lead to instability in a long term.

Figure 13B:
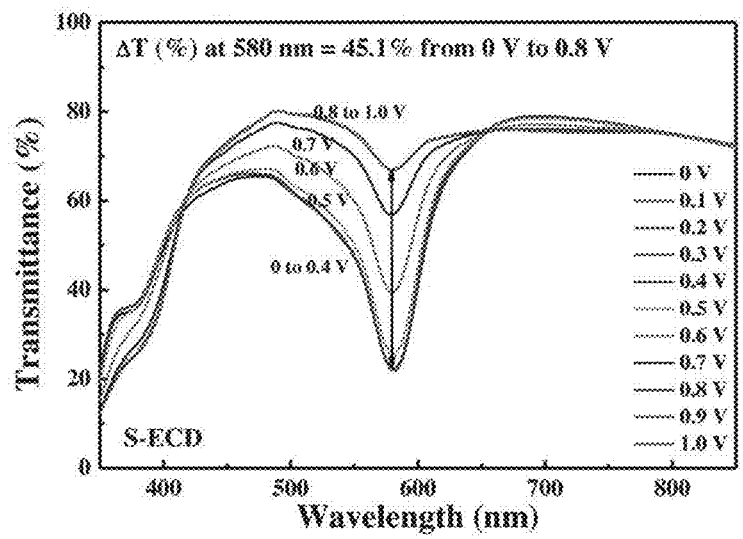
FIG. 13B shows transmittance spectra of the S-ECD at various potential biases.
Figure 13C:
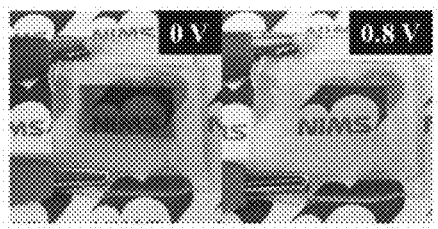
FIG. 13C shows photos of the S-ECD about transmittance change between its colored state (0 V) and bleached state (0.8 V).

The results of transmittance spectra in FIG. 13B reveal that the S-ECD required only 0.8 V to reach its bleached state. Photos of the S-ECD corresponding to the colored state (0 V, blue-purple) and bleached state (0.8 V, light-yellow) are also presented in FIG. 13C. At 580 nm (Table 1), this ECD gave a $\Delta T$ of 45.1% from 67.2% ($T_b$) to 22.1% ($T_c$). In FIG. 13B, the S-ECD was at a steady and bleached state for each of 0.8 V, 0.9 V, and 1.0 V, but an MLCT absorption of the Fe(II)-MEPE was still observed, indicating the S-ECD somehow could not be fully bleached. Since the $\Delta OD$ of the S-ECD at 580 nm (0.483) was smaller than the values of the Fe(II)-MEPE thin film and the L-ECD (0.1 M NaClO$_4$), the absolute amount of the color change was indeed smaller than that in the S-ECD. It is believed that the PMMA-based polymer electrolyte changed electrochemical activities of the NiHCF thin film and the Fe(II)-MEPE thin film, which caused a different bleached state in the S-ECD. Besides, the color change of the NiHCF thin film could still be observed since the S-ECD exhibited a $\Delta OD$ of 0.055 at 450 nm, which was close to the value of the NiHCF thin film.

Figure 14:
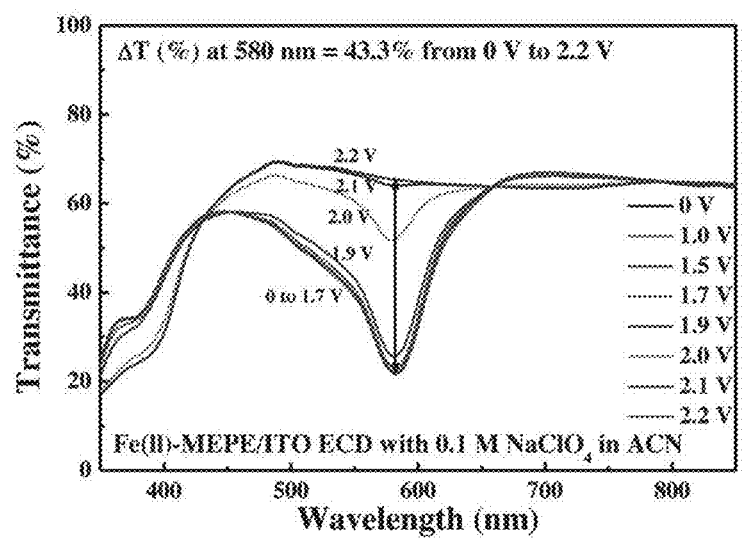
FIG. 14 shows transmittance spectra of the Fe(II)-MEPE/ITO ECD at various potential biases.

As for transmittance spectra of the Fe(II)-MEPE/ITO ECD in FIG. 14, it was found that it needed a large potential bias of 2.2 V to obtain a bleached state. This highlights an advantage of using NiHCF as CE over ITO: providing a sufficient ion storage ability that could decrease the operating potential for an ECD. As seen in Table 1, the Fe(II)-MEPE/TTO ECD exhibited a $\Delta T$ of 43.3% from 65.4% ($T_b$) to 22.1% ($T_c$) at 580 nm. The lower $\Delta T$ and the lower $T_b$ comparing to the L-ECD (0.1 M NaClO$_4$) owes to cathodically coloring characteristics of the Fe(II)-MEPE and tin oxide, making it impossible to reach a bleached state of both these materials in the ECD. Thus, using an anodically coloring material, NiHCF, could effectively increase the transparency while decreasing the operating potential of an Fe(II)-MEPE-based ECD. Additionally, in FIG. 12, the CV reveals that the Fe(II)-MEPE/ITO ECD was oxidized at a large anodic potential (>1.8 V), which was in accordance with its transmittance spectra.

Figure 15A:
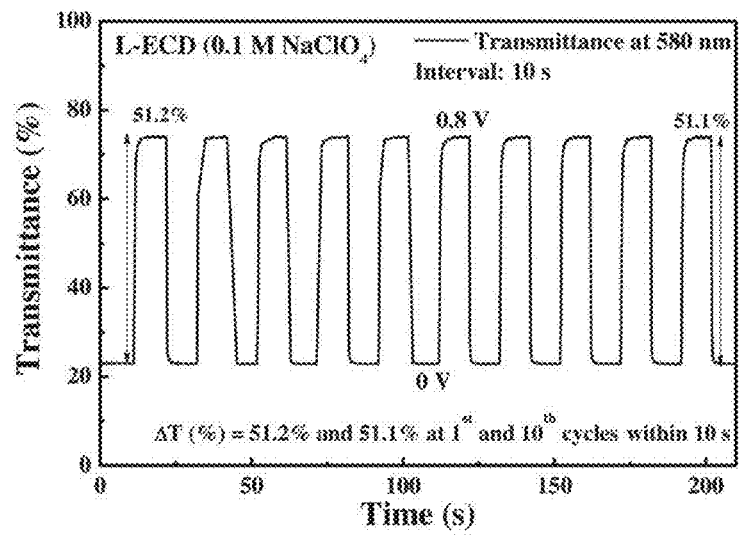
FIG. 15A shows dynamic transmittance response values of the L-ECD (0.1 M $NaClO_4$) between their colored state (0 V) and bleached state (0.8 V) with an interval time of 10 s.
Figure 15B:
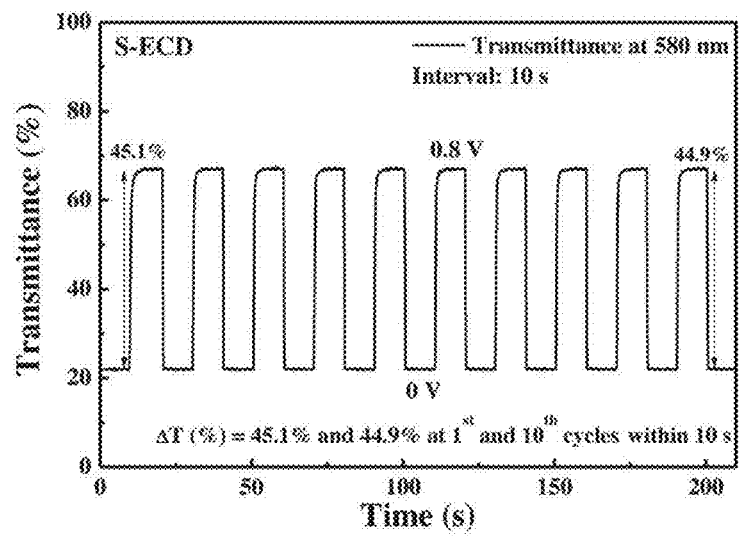
FIG. 15B shows dynamic transmittance response values of the S-ECD between their colored state (0 V) and bleached state (0.8 V) with an interval time of 10 s.
Figure 16A:
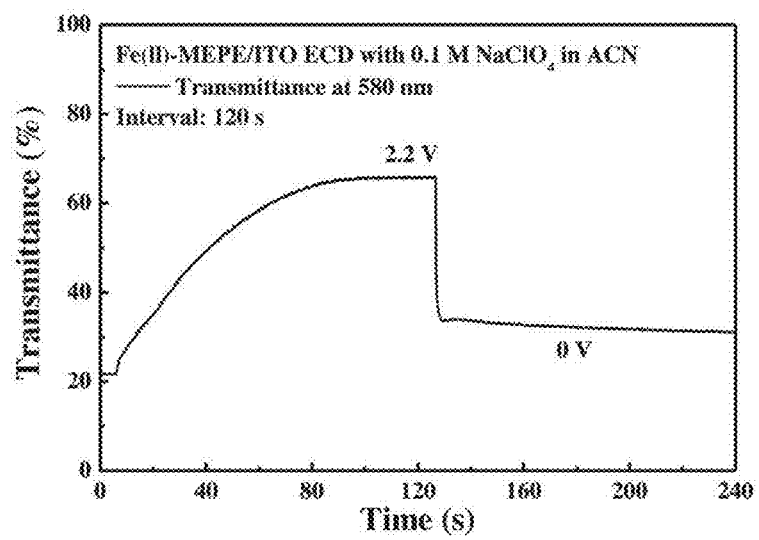
FIG. 16A shows dynamic transmittance response values of the Fe(II)-MEPE/ITO ECD between its colored state (0 V) and bleached state (2.2 V) with an interval time of 10 s.
Figure 16B:
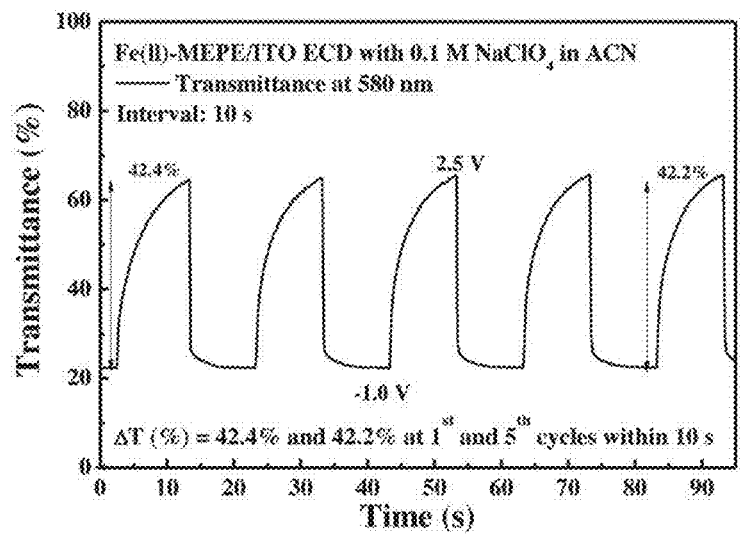
FIG. 16B shows dynamic transmittance response values of the Fe(II)-MEPE/ITO ECD between its colored state (0 V) and bleached state (2.5 V) with an interval time of 10 s.

Dynamic transmittance response values of the L-ECD (0.1 M NaClO$_4$) and the S-ECD are presented in FIG. 15A and FIG. 15B, respectively. Between 0 V and 0.8 V, both the two ECDs were switched with remarkably short switching times (the L-ECD (0.1 M NaClO$_4$): 0.98 s in bleaching and 0.43 s in coloring, the S-ECD: 1.03 sin bleaching and 0.52 sin coloring), as seen in Table 1. The S-ECD had slightly slower switching than the L-ECD (0.1 M NaClO$_4$) probably owing to a smaller ionic conductivity of the polymer electrolyte. Dynamic transmittance response values of the Fe(11)-MEPE/ITO ECD shown in FIG. 16A and FIG. 16B each individually correspond to potential biases of 2.2 V and 2.5 V. The Fe(II)-MEPE/ITO ECD could not be bleached within 120 s at 2.2 V. When the bleaching potential was increased to 2.5 V, the Fe(II)-MEPE/ITO ECD exhibited switching times of 7.68 s in bleaching and 1.67 s in coloring. The long switching times, especially the bleaching time, are probably because the reaction on the CE relied on the side reaction generated on ITO (<−1.0 V in FIG. 7). The sluggish mechanism of this reaction is believed to have limited the switching times. It is clear that providing enough ion storage ability by using NiHCF as CE instead of ITO is more desirable from a viewpoint of the switching times. As seen in Table 1, this ECD exhibited relatively long switching times of 7.68 s in bleaching and 1.67 s in coloring at 2.5 V. Apparently, the L-ECD (0.1 M NaClO$_4$) and the S-ECD are favorable for potential application of EC display because of the switching times.

Figure 17A:
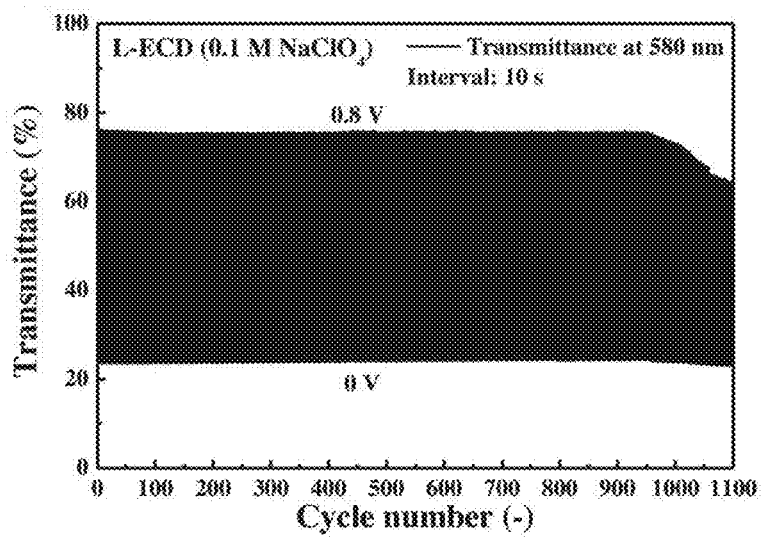
FIG. 17A shows long-term stability data of the L-ECD (0.1 M $NaClO_4$) about transmittance change between their colored state (0 V) and bleached state (0.8 V) with an interval time of 10 s.
Figure 17B:
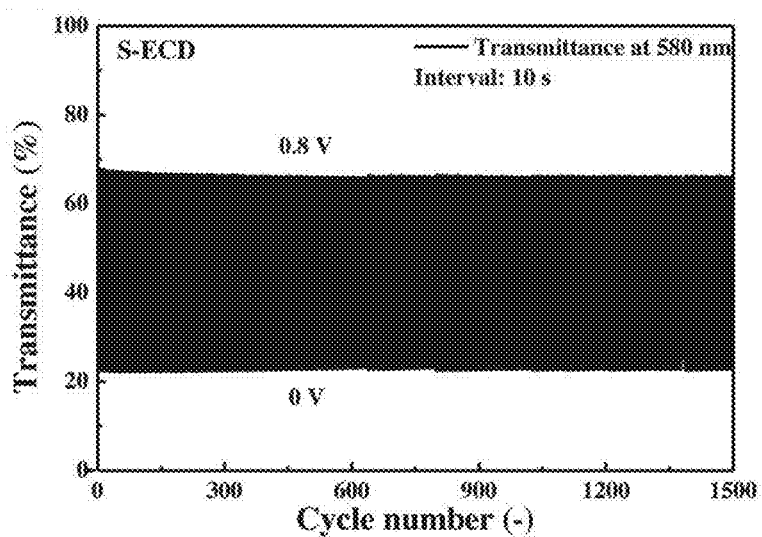
FIG. 17B shows long-term stability data of the S-ECD about transmittance change between their colored state (0 V) and bleached state (0.8 V) with an interval time of 10 s.

Long-term stability data of the L-ECD (0.1 M NaClO$_4$) (see FIG. 17A) and the S-ECD (see FIG. 17B) were measured by changing these ECDs between their colored state (0 V) and bleached state (0.8 V). Switching from 0 V to 0.8 V and switching backward are defined as "1 cycle". The ΔT after n cycles and the retained ratio (ΔT at n cycles/ΔT at 1st cycle) are listed in Table 4 below. As shown, the ECDs each demonstrate a stable operation within 1,000 cycles with more than 95% of their original ΔT retained. When the L-ECD (0.1 M NaClO$_4$) was operated for more than 1,000 cycles, the electrolyte was leaking and some part of the ECD remained inactive, leading to a decrease of transparency (FIG. 17A). On the contrary, the S-ECD exhibited extraordinary stability that less than 5% degradation was found after 1,500 cycles in (FIG. 17B). Although the L-ECD (0.1 M NaClO$_4$) gave a larger optical change, the S-ECD was found to be more practical for application in terms of stability.

TABLE 4

Long-term stability data of the L-ECD (0.1M NaClO$_4$) and the S-ECD.

| System | ΔT at 1$^{st}$ cycle (%) | ΔT at 500$^{th}$ cycle (%) | ΔT at 1000$^{th}$ cycle (%) | ΔT at 1100$^{th}$ cycle (%) | ΔT at 1500$^{th}$ cycle (%) |
|---|---|---|---|---|---|
| L-ECD (0.1M NaClO$_4$) | 51.2 | 50.9 (99.4%)$^a$ | 48.7 (95.1%) | 41.4 (80.9%) | — |
| S-ECD | 45.1 | 43.4 (96.2%) | 43.2 (95.8%) | 43.3 (96.0%) | 43.0 (95.3%) |

$^a$Retained ratio (ΔT at n cycles/ΔT at 1$^{st}$ cycle) after n cycles.

A comparison list on EC performance of MEPE-based ECDs and PBAs-based ECDs is presented in Table 5, which is available from some literatures. As can be seen in the table, this study is the first one to fabricate an ECD based on an MEPE and a Prussian blue analogue. Among the reported literatures, the S-ECD requires the smallest potential window (0 to 0.8 V) to achieve the largest ΔT (45.1%). Considering the stability, few literatures have provided data about the stability of MEPE-based ECDs, and only one has proposed a comparable stability to the S-ECD (>1,500 cycles). In the literature, however, the ΔT of this ECD was poor (21.4%). In conclusion, our design can not only provide the unique combination of materials that has not been reported before, but also excel other MEPE-based ECDs in terms of EC performance.

TABLE 5

Comparison list on EC performance of MEPE-based ECDs and PBAs-based ECDs available form some literatures.

| ECD | $V_b/V_c^f$ (V) | $T_b/T_c/\Delta T$ (%) ($\lambda_{max}$ (nm)) | $t_b/t_c$ (s) | Stability | Ref. |
|---|---|---|---|---|---|
| Fe(II)-MEPE/ V-oxide$^a$ | 1.6/0 | 58/22/36$^g$ (585) | — | — | 1 |
| [MEPE-Cu(I)]$^b$/ PANI$^c$ | 1.5/0.8 | 61.5/40.1/21.4 (580) | 0.2/0.4 | >1,500 cycles | 2 |
| PB/NiHCF | −0.8/0.2 | —/—/— (700) | 7.1/6.7 | >10,000 cycles | 3 |
| PB/ZnHCF | −1.2/−0.2 | —/—/59.0 (700) | 6.1/2.8 | — | 4 |
| PB/MoOHCF$^d$ | −1.5/1.0 | ~60/~20/~40 (500) | —/— | — | 5 |

TABLE 5-continued

Comparison list on EC performance of MEPE-based ECDs
and PBAs-based ECDs available form some literatures.

| ECD | $V_b/V_c^f$ (V) | $T_b/T_c/\Delta T$ (%) ($\lambda_{max}$ (nm)) | $t_b/t_c$ (s) | Stability | Ref. |
|---|---|---|---|---|---|
| PG1[e]/ZnHCF | −0.4/0.1 | 72/12/60 (490) | 1.1/1.7 | >4,000 cycles | 6 |
| S-ECD | 0.8/0 | 67.2/22.1/45.1 (580) | 1.03/0.52 | >1,500 cycles | This study |

[a]Vanadium oxide;
[b]Poly[Cu(I)-bis(2,2':6',2''-terpyridyl)benzene];
[c]Polyaniline;
[d]Molybdate hexacyanoferrate;
[e]triphenylamine dendritic polymer;
[f]Potential for bleaching/coloring ($V_b/V_c$);
[g]Visible light transmittance Ref 1: Schott, M.; Szczerba, W.; Posset, U.; Surca Vuk, A.; Beck, M.; Riesemeier, H.; Thunemann, A. F.; Kurth, D. G. In Operando XAFS Experiments on Flexible Electrochromic Devices Based on Fe(II)-Metallo-Supramolecular Polyelectrolytes and Vanadium Oxide. *Sol. Energy Mater. Sol. Cells* 2016, 147, 61-67

Ref 2: Chen, W. H.; Chang, T. H.; Hu, C. W.; Ting, K. M.; Liao, Y. C.; Ho, K. C. An Electrochromic Device Composed of Metallo-Supramolecular Polyelectrolyte Containing Cu(I) and Polyaniline-Carbon Nanotube. *Sol. Energy Mater. Sol. Cells* 2014, 126, 219-226

Ref 3: Hara, S.; Shiozaki, H.; Omura, A.; Tanaka, H.; Kawamoto, T.; Tokumoto, M.; Yamada, M.; Gotoh, A.; Kurihara, M.; Sakamoto, M. Color-Switchable Glass and Display Devices Fabricated by Liquid Processes with Electrochromic Nanoparticle "Ink". *Appl. Phys. Express* 2008, 1, 1040021-1040023

Ref 4: Lee, K. M.; Tanaka, H.; Takahashi, A.; Kim, K. H.; Kawamura, M.; Abe, Y.; Kawamoto, T. Accelerated Coloration of Electrochromic Device with The Counter Electrode of Nanoparticulate Prussian Blue-Type Complexes. *Electrochim. Acta* 2015, 163, 288-295

Ref 5: Liao, H. Y.; Liao, T. C.; Chen, W. H.; Chang, C. H.; Chen, L. C. Molybdate Hexacyanoferrate (MoOHCF) Thin Film: A Brownish Red Prussian Blue Analog for Electrochromic Window Application. *Sol. Energy Mater. Sol. Cells* 2016, 145, 8-15

Ref 6: Kao, S. Y.; Lin, Y. S.; Chin, K.; Hu, C. W.; Leung, M. K.; Ho, K. C. High Contrast and Low-Driving Voltage Electrochromic Device Containing Triphenylamine Dendritic Polymer and Zinc Hexacyanoferrate. *Sol. Energy Mater. Sol. Cells* 2014, 125, 261-267

Sunlight-Attenuated Feature of the S-ECD for Smart Window

Figure 18A:
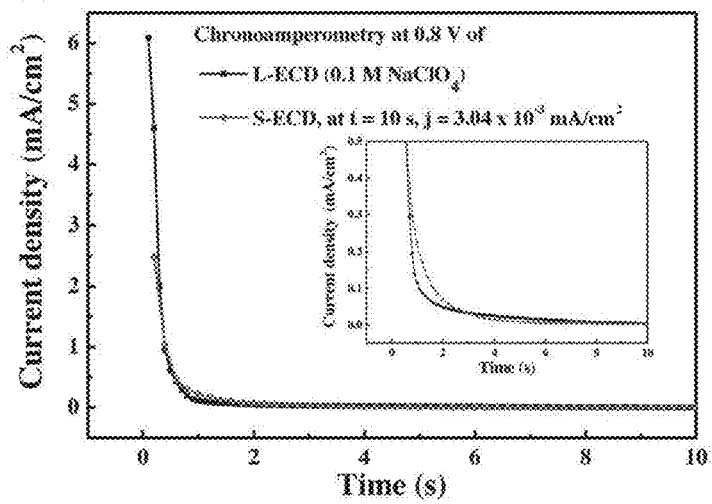
FIG. 18A shows chronoamperograms at 0.8 V for 10 s of the L-ECD (0.1 M $NaClO_4$) (squares) and the S-ECD (circles)
Figure 18B:
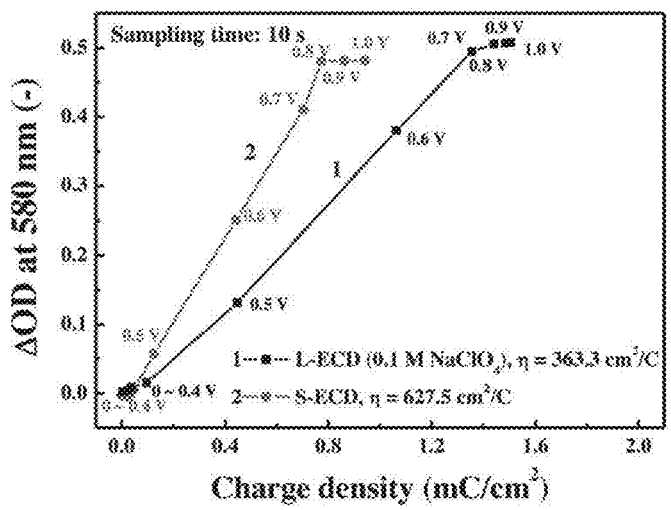
FIG. 18B shows a relationship between the charge density and the $\Delta OD$ (580 nm) of the L-ECD (0.1 M $NaClO_4$) (squares) and the S-ECD (circles) at various potential biases.

To evaluate the performance of the S-ECD as a smart window, it is necessary to test its consuming energy during operation. From chronoamperograms at 0.8 V of the L-ECD (0.1 M NaClO$_4$) and the S-ECD (see FIG. 18A), the storage charge density values of the proposed ECDs (q (C/cm$^2$)) could be calculated by integrating the current density (j (A/cm$^2$)) for a fixed sampling time (10 s), and the consuming energy per area could be represented as: E (J/cm$^2$)=q (C/cm$^2$)×V (V). When the operation was carried out at 0.8 V for 10 seconds, the L-ECD (0.1 M NaClO$_4$) consumed an energy of 11.52×10$^{-4}$ (J/cm$^2$), while the S-ECD consumed a smaller energy of 6.88×10$^{-4}$ (J/cm$^2$) owing to a smaller current density. The calculated energy per area represents a required energy to switch the propose ECDs on and operate them for 10 s. For comparison, the relationships between the charge density and the ΔOD (580 nm) at various potential biases are recorded in FIG. 18B. The coloration efficiency (η (cm$^2$/C), η=ΔOD/q) could be obtained by fitting a ΔOD (580 nm) against a charge density from the chronoamperograms at different potential biases. FIG. 18B shows that the S-ECD had a higher coloration efficiency of 627.5 cm$^2$/C than 363.5 cm$^2$/C of the L-ECD (0.1 M NaClO$_4$) because of a smaller charge density. As indicated in some literatures, the electric double layer capacitance of thin films in a polymer electrolyte would decrease because of a lower ionic conductivity. This theory is believed to have caused a smaller current/ charge density of the S-ECD comparing to the L-ECD (0.1 M NaClO$_4$), and thus the S-ECD had a higher coloration efficiency.

Figure 19:
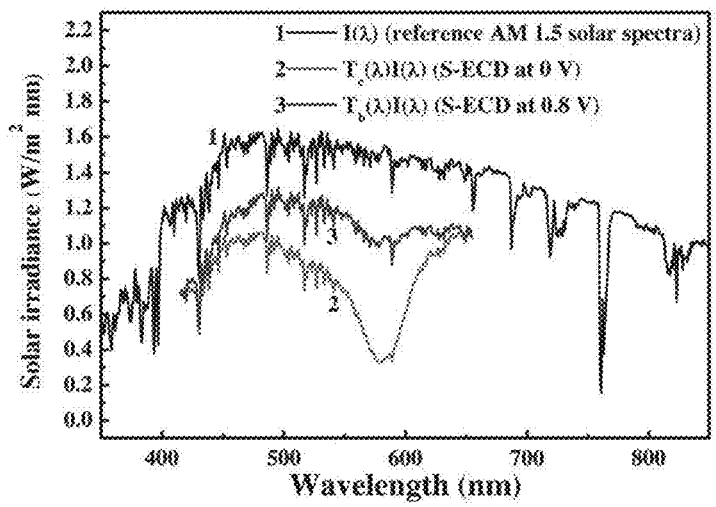
FIG. 19 shows a solar irradiance spectrum without attenuation($I(\lambda)$), attenuated by the colored S-ECD ($T_c(\lambda)I(\lambda)$), and attenuated by the bleached S-ECD ($T_b(\lambda)I(\lambda)$).

As shown in FIG. 13B, the S-ECD possesses a dramatic change in optical characteristics between 415 nm and 655 nm, which is suitable for its application to a smart window. According to the solar irradiance spectrum (I(λ) (W/m$^2$ nm), where λ represents a wavelength) from the national renewable energy laboratory (NREL) in the US, this region fits the highest solar irradiance among visible light, as plotted in FIG. 19. Within an interested region, the solar irradiance could be calculated by the following equation: ∫I(λ)dλ. Between 415 nm and 655 nm, a solar irradiance of 295.1 W/m was calculated without any attenuation. If the S-ECD is applied to a smart window, the attenuated solar irradiance spectrum could be represented as T$_c$(λ)I(λ) at a colored state and T$_b$(λ)I(λ) at a bleached state (see FIG. 19), where T$_c$(λ) and T$_b$(λ) are transmittance spectra of the S-ECD. That is, with a larger change between T$_c$(λ) and T$_b$(k), an ECD could attenuate more solar irradiance. Similarly, attenuated solar irradiances at different states could be obtained by the following terms: ∫T$_c$(λ)I(λ)dλ and ∫T$_b$(λ)I(λ)dλ. The calculation indicates that between 415 nm and 655 nm, solar irradiances of 195.5 W/m$^2$ and 260.9 W/m$^2$ passed through the S-ECD at the colored state and the bleached state, respectively. In other words, solar irradiances of 99.6 W/m$^2$ and 34.2 W/m$^2$ were attenuated by the colored S-ECD and the bleached S-ECD, respectively. Moreover, in FIG. 18A, the consumed power per area (W/m$^2$) of the S-ECD at a steady-state operation (t=10 s) could be calculated by multiplying a current density ((A/m$^2$)) by a potential bias (V (V)). A consumed power of 0.0243 W/m$^2$ of the S-ECD was obtained at its steady state. In brief, the S-ECD attenuated a high solar irradiance of 99.6 W/m$^2$ at a colored state (i.e., at a steady-state). When it is needed for indoor users, the S-ECD could be switched on to the bleached state and consume a power per area of 0.0243 W/m$^2$, providing high transparency for the building. At this stage, a moderate solar irradiance of 34.2 W/m² was attenuated. Thus, a solar irradiance of 65.4 W/m² was modulated between the colored and bleached states of the S-ECD. The results here indicate a high potential of the S-ECD as sunlight-attenuated smart window since it consumed a low power (0.0243 W/m²) during the operation at the bleached state while providing a high absorbing amount of solar irradiance (99.6 W/m²) at rest.

Conclusions about Experiments Carried Out

The combination of an Fe(II)-MEPE and an NiHCF in an ECD (L-ECD (0.1 M NaClO₄)) was firstly investigated and the EC performance of this design on an all-solid-state ECD (S-ECD) was also examined. Throughout our characterizations, several important advantages of the utilization of the NiHCF as CE in the L-ECD (0.1 M NaClO₄) over ITO in the Fe(III)-MEPE/ITO ECD were revealed as follows: a lower operating potential (0.8 V contrasting to 2.5 V); higher transparency ($T_b$=74.3% contrasting to 65.4%) and a higher $\Delta T$ (51.2% contrasting to 43.3%) at 580 nm; and shorter switching times (0.98 s in contrast to 7.68 s in bleaching and 0.43 s in contrast to 1.67 s in coloring). To solve the instability and further apply this design to more practical applications, the S-ECD with a polymer electrolyte was fabricated. At 580 nm, the S-ECD exhibited a large $\Delta T$ of 45.1% with switching times of 1.03 s in bleaching and 0.52 s in coloring by a small potential bias of 0.8 V. The S-ECD remained stable after 1,500 cycles of operation, which demonstrates the superiority of the S-ECD to the L-ECD (0.1 M NaClO₄) in long-term operation stability.

Regarding the application to a smart window, the S-ECD is promising because of its large attenuated amount of solar irradiance (99.6 W/m²) at the colored state and the consumption of a very small power of 0.0243 W/m² to stay at the bleached state. From the exceptional EC performance and the desirable sunlight-attenuated feature, it is believed that the design of S-ECD would be a worthy candidate for further potential applications.

The invention claimed is:

1. An electrochromic device (ECD) comprising:
two metal-complex-based electrochromic thin films individually acting as a working electrode and a counter electrode;
(i) one of the two metal-complex-based electrochromic thin films being a film of a cathodically coloring metallo-supramolecular polymer comprising at least one organic ligand having a plurality of metal coordination positions and a metal ion of at least one transition metal and/or lanthanoid metal with the at least one organic ligand and the metal ion being arranged alternately, wherein the at least one transition metal and/or lanthanoid metal consists of a metal selected from the group consisting of iron (Fe), nickel (Ni), copper (Cu), zinc (Zn), ruthenium (Ru), rhodium (Rh), palladium (Pd), silver (Ag), osmium (Os), iridium (Ir), platinum (Pt), gold (Au), europium (Eu), and terbium (Tb); and the other of the two metal-complex-based electrochromic thin films being a film of anodically coloring metal hexacyanoferrate (MHCF) represented by the formula: M(II)₃[Fe(III)CN₆]₂ where M is at least one metal selected from the group consisting of Fe, and Zn; and
(ii) the electrochromic device having a configuration of a first conducting substrate; the film of the cathodically coloring metallo-supramolecular polymer; an electrolyte; the film of the anodically coloring metal hexacyanoferrate (MHCF); and a second conducting substrate being arranged in this order, wherein the at least one organic ligand comprises an organic ligand having a structure represented by at least one of the following formulae:

(1-1)

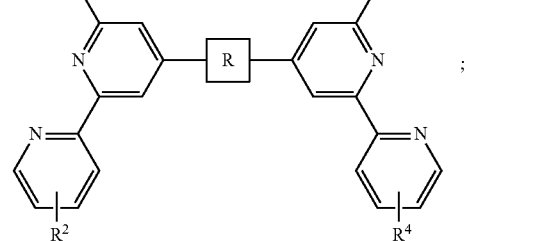

(1-2)

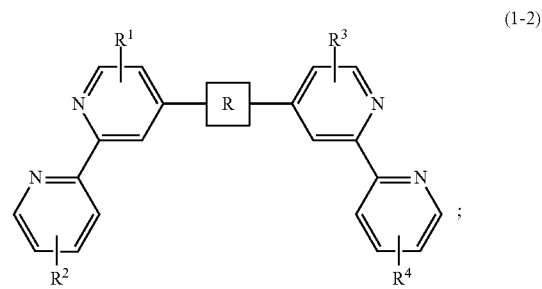

(1-3)

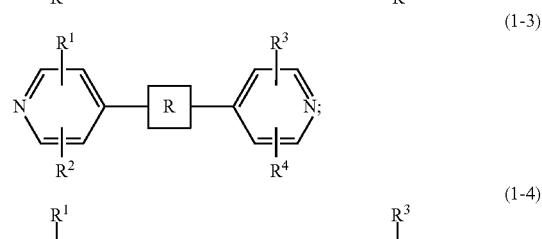

(1-4)

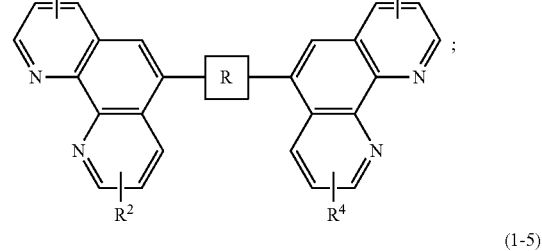

(1-5)

wherein R is a spacer comprising a carbon atom(s) and a hydrogen atom(s), or a spacer directly connecting two moieties, the spacer independently selected from the group consisting of terpyridyl group, bipyridyl group, pyridyl group, phenanthrolyl group, and acetylacetonato group;

wherein $R^1$, $R^2$, $R^3$, and $R^4$ are each independently a hydrogen atom, an aryl group, or an alkyl group;

wherein the electrolyte is a liquid electrolyte or a solid-state electrolyte; and wherein, when the electrolyte is a solid-state electrolyte, the solid-state electrolyte comprises at least one selected from the group consisting of acetonitrile, a poly(methyl methacrylate) (PMMA), propylene carbonate (PC), and $MClO_4$ where M=Li or Na.

2. The electrochromic device according to claim 1, wherein the at least one organic ligand comprises an organic ligand having at least two moieties, each of the two moieties independently selected from the group consisting of terpyridyl group, bipyridyl group, pyridyl group, phenanthrolyl group, acetylacetonato group and their derivatives.

3. The electrochromic device according to claim 1, wherein the at least one transition metal and/or lanthanoid metal is iron (Fe).

4. The electrochromic device according to claim 1, wherein the other of the two metal-complex-based electrochromic thin films is the film of the anodically coloring metal hexacyanoferrate (MHCF) represented by the formula: $M(II)_3[Fe(III)CN_6]_2$ wherein M is Zn.

\* \* \* \* \*